(12) United States Patent
Wu

(10) Patent No.: US 12,467,846 B2
(45) Date of Patent: Nov. 11, 2025

(54) METHODS FOR ARRAY BINNING FLOW CYTOMETRY DATA AND SYSTEMS FOR SAME

(71) Applicant: Becton, Dickinson and Company, Franklin Lakes, NJ (US)

(72) Inventor: Austin Wu, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 302 days.

(21) Appl. No.: 17/992,425

(22) Filed: Nov. 22, 2022

(65) Prior Publication Data

US 2023/0243734 A1  Aug. 3, 2023

Related U.S. Application Data

(60) Provisional application No. 63/304,213, filed on Jan. 28, 2022.

(51) Int. Cl.
*G01N 15/1434* (2024.01)
*G01N 15/1429* (2024.01)

(52) U.S. Cl.
CPC ..... *G01N 15/1434* (2013.01); *G01N 15/1429* (2013.01)

(58) Field of Classification Search
CPC ........... G01N 15/1427; G01N 15/1429; G01N 15/1434; G01N 15/1459; G01N 2015/1402; G01N 2015/1006
See application file for complete search history.

(56) References Cited

U.S. PATENT DOCUMENTS

| | | | | |
|---|---|---|---|---|
| 8,787,776 B2* | 7/2014 | Carusone | ........... | H04B 10/6971 |
| | | | | 398/208 |
| 9,243,995 B2* | 1/2016 | Fox | ..... | G01N 15/1429 |
| 9,816,929 B2* | 11/2017 | Feng | ................ | G02B 21/0032 |
| 11,852,578 B2* | 12/2023 | Hara | ................ | G01N 15/1012 |
| 2006/0051096 A1* | 3/2006 | Cox | .................. | G01N 15/1459 |
| | | | | 398/130 |
| 2010/0053614 A1* | 3/2010 | Jeys | .................. | G01N 15/1434 |
| | | | | 356/337 |

(Continued)

FOREIGN PATENT DOCUMENTS

WO  WO2001028700 A1  4/2001

*Primary Examiner* — Kara E. Geisel
*Assistant Examiner* — Christina I Xing
(74) *Attorney, Agent, or Firm* — Khin K. Chin; Bret E. Field; BOZICEVIC, FIELD & FRANCIS LLP

(57) ABSTRACT

Aspects of the present disclosure include methods for array binning data signals from a photodetector (e.g., in a flow cytometer). Methods according to certain embodiments include detecting light with a light detection system from a particle irradiated by a light source in a flow stream, generating data signals in a plurality of photodetector channels in response to the detected light and binning data signals from two or more different photodetector channels to generate combined spectral data signals. Light detection systems having a detector component and a modulator component configured to bin data signals from two or more different photodetector channels are described. Systems (e.g., particle analyzer) having a light source and a light detection system for practicing the subject methods are also described. Non-transitory computer readable storage medium is also provided.

20 Claims, 17 Drawing Sheets

(56) References Cited

U.S. PATENT DOCUMENTS

| | | | |
|---|---|---|---|
| 2012/0091366 A1* | 4/2012 | Durack | G01N 15/1459 250/200 |
| 2013/0204538 A1* | 8/2013 | Rich | G01J 3/18 702/21 |
| 2014/0091014 A1* | 4/2014 | Wagner | B07C 5/34 209/579 |
| 2015/0056645 A1* | 2/2015 | Vacca | G01N 15/1459 435/29 |
| 2019/0226975 A1* | 7/2019 | Osborne | G01N 15/1459 |
| 2019/0387972 A1 | 12/2019 | Hu et al. | |
| 2020/0333236 A1 | 10/2020 | Li et al. | |
| 2021/0318224 A1* | 10/2021 | Hara | G01N 15/0205 |
| 2021/0341374 A1 | 11/2021 | Vacca et al. | |

* cited by examiner

| Laser | Time Delay (μs) | Dye | 16ch Mapping | 32ch Mapping |
|---|---|---|---|---|
| UV | (-32) to (-30) | BUV496 | Σ(Ch2, Ch3) | Σ(Ch3, Ch4, Ch5, Ch6) |
| | | BUV563 | Σ(Ch5, Ch6) | Σ(Ch9, Ch10, Ch11, Ch12) |
| | | BUV615 | Ch7 | Σ(Ch13, Ch14) |
| | | BUV661 | Σ(Ch9, Ch10) | Σ(Ch17, Ch18, Ch19, Ch20) |
| | | BUV737 | Σ(Ch12, Ch13) | Σ(Ch23, Ch24, Ch25, Ch26) |
| | | BUV805 | Σ(Ch14, Ch15, Ch16) | Σ(Ch27, Ch28, Ch29, Ch30, Ch31, Ch32) |
| Violet | (-15) to (-13) | BV421 | Ch1 | Σ(Ch1, Ch2) |
| | | BV480 | Ch2 | Σ(Ch2, Ch3) |
| | | BV570 | Σ(Ch5, Ch6) | Σ(Ch9, Ch10, Ch11, Ch12) |
| | | BV605 | Ch7 | Σ(Ch13, Ch14) |
| | | BV650 | Σ(Ch8, Ch9) | Σ(Ch15, Ch16, Ch17, Ch18) |
| | | BV711 | Ch11 | Σ(Ch21, Ch22) |
| | | BV750 | Σ(Ch12, Ch13) | Σ(Ch23, Ch24, Ch25, Ch26) |
| | | BV786 | Σ(Ch14, Ch15) | Σ(Ch27, Ch28, Ch29, Ch30) |
| | | BV829 | Ch16 | Σ(Ch31, Ch32) |
| Blue | (0) to (2) | BB515 | Σ(Ch3, Ch4) | Σ(Ch9, Ch10, Ch11, Ch12) |
| | | BB630 | Ch8 | Σ(Ch15, Ch16) |
| | | BB660 | Ch9 | Σ(Ch17, Ch18) |
| | | BB700 | Σ(Ch10, Ch11) | Σ(Ch19, Ch20, Ch21, Ch22) |
| | | BB755 | Σ(Ch12, Ch13) | Σ(Ch23, Ch24, Ch25, Ch26) |
| | | BB790 | Σ(Ch14, Ch15) | Σ(Ch27, Ch28, Ch29, Ch30) |
| Yel-Grn | (15) to (13) | PE | Σ(Ch5, Ch6) | Σ(Ch9, Ch10, Ch11, Ch12) |
| | | PE-CF594 | Ch7 | Σ(Ch13, Ch14) |
| | | PE-Cy5 | Ch9 | Σ(Ch17, Ch18) |
| | | PE-Cy5.5 | Ch10 | Σ(Ch19, Ch20) |
| | | PE-Cy7 | Σ(Ch14, Ch15) | Σ(Ch27, Ch28, Ch29, Ch30) |
| Red | (30) to (32) | APC | Σ(Ch9, Ch10) | Σ(Ch17, Ch18, Ch19, Ch20) |
| | | APC-R700 | Σ(Ch11, Ch12) | Σ(Ch21, Ch22, Ch23, Ch24) |
| | | APC-Cy7 | Σ(Ch14, Ch15) | Σ(Ch27, Ch28, Ch29, Ch30) |

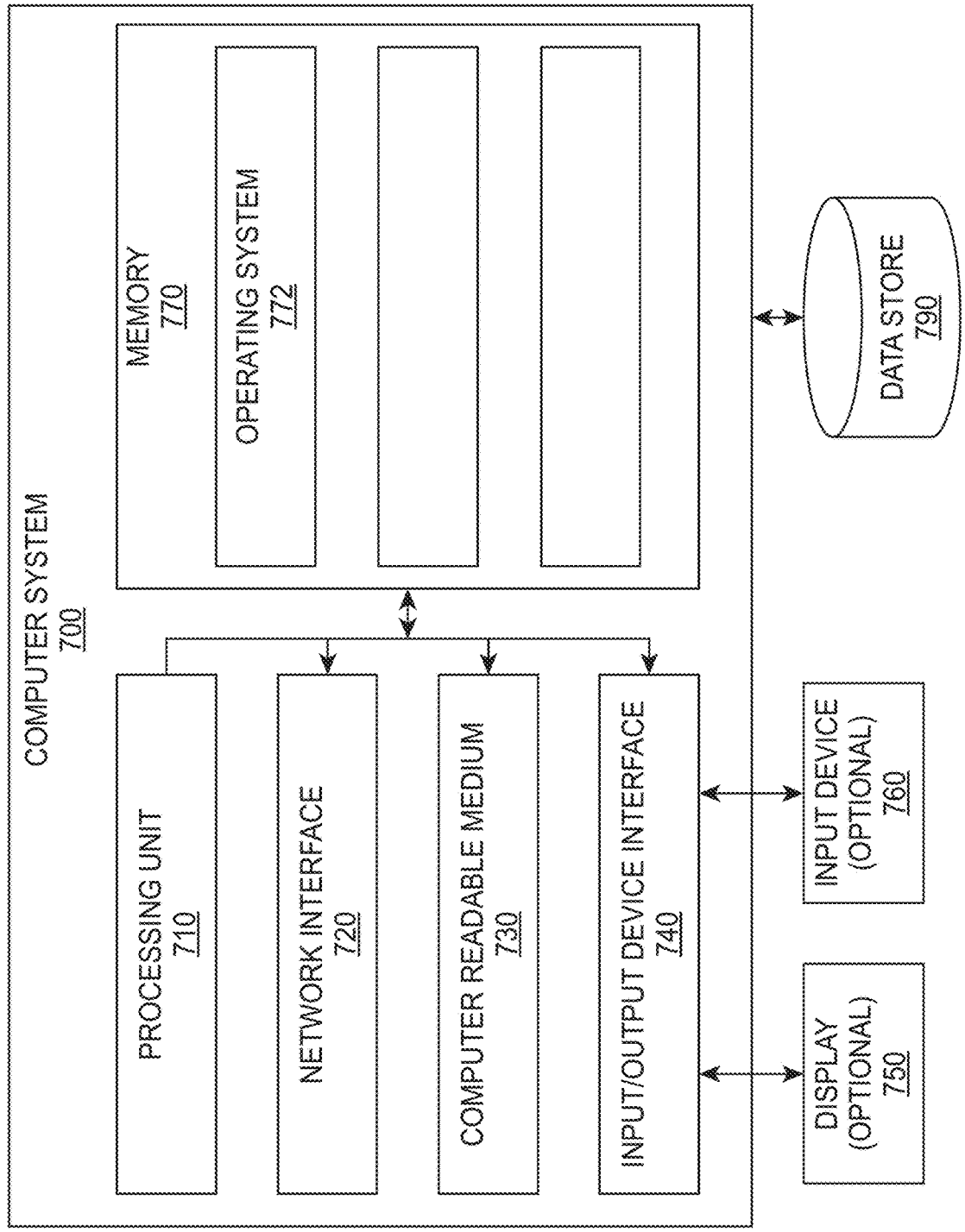

METHODS FOR ARRAY BINNING FLOW CYTOMETRY DATA AND SYSTEMS FOR SAME

CROSS-REFERENCE TO RELATED APPLICATIONS

Pursuant to 35 U.S.C. § 119 (e), this application claims priority to the filing dates of U.S. Provisional Patent Application Ser. No. 63/304,213 filed Jan. 28, 2022, the disclosure of which application is incorporated herein by reference in their entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector.

One technique that utilizes light detection to characterize the components in a sample is flow cytometry. A flow cytometer includes a photo-detection system made up of the optics, photodetectors and electronics that enable efficient detection of optical signals and its conversion to corresponding electric signals. The electronic signals are processed to obtain parameters that a user can utilize to perform desired analysis. The parameters measured using a flow cytometer typically include the excitation light that is scattered by the particle along a mostly forward direction, referred to as forward scatter (FSC), the excitation light that is scattered by the particle in a mostly sideways direction, referred to as side scatter (SSC), and the light emitted from fluorescent molecules in one or more channels (range of frequencies) of the spectrum, referred to as FL1, FL2, etc., or by the fluorescent dye that is primarily detected in that channel. Different cell types can be identified by the scatter parameters and the fluorescence emissions resulting from labeling various cell proteins with dye-labeled antibodies.

Cytometers further include means for recording and analyzing the measured data. For example, data storage and analysis may be carried out using a computer connected to the detection electronics. The data can be stored in tabular form, where each row corresponds to data for one particle, and the columns correspond to each of the measured parameters. The use of standard file formats, such as an "FCS" file format, for storing data from a particle analyzer facilitates analyzing data using separate programs and/or machines.

SUMMARY

Aspects of the present disclosure include methods for array binning data signals from a photodetector (e.g., in a flow cytometer). Methods according to certain embodiments include detecting light with a light detection system from a particle irradiated by a light source in a flow stream, generating data signals in a plurality of photodetector channels in response to the detected light and binning data signals from two or more different photodetector channels to generate combined spectral data signals. Light detection systems having a detector component and a modulator component configured to bin data signals from two or more different photodetector channels are described. Systems (e.g., particle analyzer) having a light source and a light detection system for practicing the subject methods are also described. Non-transitory computer readable storage medium is also provided.

In practicing the subject methods, light is detected with a light detection system from a particle irradiated by a light source in a flow stream and data signals are generated in a plurality of photodetector channels in response to the detected light. In some embodiments, the data signals are generated based on detecting one or more of light absorption, light scatter, light emission (e.g., fluorescence) from the sample in the flow stream. In some instances, the data signals are generated in a scattered light detector channel (e.g., forward scatter image data, side scatter image data). In yet other instances, the data signals are generated in one or more fluorescence detector channels (e.g., fluorescent marker image data). In other instances, the data signals are generated in a light loss detector channel. In still other instances, the data signals are generated in a combination of two or more of light scatter detector channels, fluorescence detector channels and light loss detector channels. In some embodiments, the light detection system includes two or more photodetectors, such as 3 or more, such as 4 or more, such as 5 or more and including 10 or more photodetectors. In some instances, the photodetectors form a photodetector array, such as a photodetector array having 4 or more photodetectors, such as 8 or more, such as 12 or more, such as 16 or more, such as 24 or more and including a photodetector array with 48 or more photodetectors.

In embodiments, methods include binning data signals from two or more different photodetector channels. In some instances, data signals from two or more different photodetector channels are binned to generate combined spectral data signals. In some instances, methods include binning data signals from non-adjacent photodetectors. In other instances, methods include binning data signals from adjacent photodetectors. In certain instances, methods include horizontal binning of adjacent photodetectors. In some embodiments, data signals from three or more different photodetector channels are binned, such as 4 or more, such as 5 or more, such as 6 or more, such as 16 or more, such as 32 or more and including binning 64 or more different photodetector channels. In certain embodiments, methods include dynamically binning data signals from two or more different photodetector channels in real time.

In certain embodiments, data signals from one or more photodetector channels are amplified. In some instances, methods include amplifying data signals from each photodetector channel and binning the amplified data signals. In embodiments, the data signals may be generated in 4 or more photodetector channels, such as 8 or more photodetector channels, such as 16 or more photodetector channels, such as 32 or more photodetector channels and including in 64 or more photodetector channels. In some embodiments, the generated data signals are multiplexed. In some instances, the multiplexed data signals are binned. In some embodiments, the multiplexed data signals are wavelength separated data signals. In some embodiments, the multiplexed data signals are time separated data signals. In some embodiments, the multiplexed data signals are time and wavelength separated data signals.

In some embodiments, methods include irradiating the particle in the flow stream with the light source. In some instances, the light source includes a plurality of lasers, such as where the plurality of lasers are configured to irradiate the flow stream at positions that are spaced apart from each other. In some instances, each of the lasers outputs a different wavelength of light. In some instances, the particle in the flow stream is irradiated in discrete intervals with each of the lasers, such as where each laser has an irradiation duration of from 1 µs to 50 µs.

In some embodiments, methods include binning the data signals from the photodetector channels based on the irradiation wavelength of each of the lasers. In some instances, the data signals from the photodetector channels are binned based on a time delay for each of the lasers. In certain instances, methods include mapping a binning configuration for each different laser and for each photodetector channel, for example where the binning configuration is dynamically mapped in real-time.

Aspects of the present disclosure also include light detection systems. In embodiments, light detection systems include a detector component having a photodetector configured to detect light from a particle irradiated in a flow stream and to generate data signals in a plurality of photodetector channels in response to the detected light and a modulator component configured to bin data signals from two or more different photodetector channels. In embodiments, the detector component includes one or more of light scatter photodetectors, fluorescence light photodetectors and light loss photodetectors. In some instances, the detector component includes a forward scatter photodetector. In some instances, the detector component includes a side scatter photodetector. In some instances, the detector component includes a back scatter photodetector. In some instances, the detector component includes one or more fluorescence photodetectors. In some instances, the detector component includes a light loss photodetector. In some instances, the detector component includes a darkfield photodetector. In some instances, the detector component includes a brightfield photodetector. In some embodiments, the light detection system includes two or more photodetectors, such as 3 or more, such as 4 or more, such as 5 or more and including or more photodetectors. In some instances, the photodetectors form a photodetector array, such as a photodetector array having 4 or more photodetectors, such as 8 or more, such as 12 or more, such as 16 or more, such as 24 or more and including a photodetector array with 48 or more photodetectors. In some embodiments, the detector component is configured to generate data signals in 4 or more photodetector channels, such as 16 or more, such as 32 or more and including in 64 or more photodetector channels.

In some instances, the detector component of the light detection system includes a spectrometer, such as where the spectrometer includes a light dispersion component that spectrally separates light collected from the irradiated particle. In some embodiments, each photodetector channel is configured to generate data signals in response to a predetermined spectral range of light. In some instances, the spectrometer disperses light into different spectral components and data signals are generated in one or more photodetector channels for each separated spectral component of light. In some instances, adjacent spectral components of the light generate data signals in adjacent photodetector channels. In some instances, adjacent spectral components of the light generate data signals in non-adjacent photodetector channels.

In embodiments, the light detection system includes a modulator component that bins data signals from different photodetector channels. In some embodiments, the modulator is configured to bin data signals from two or more different photodetector channels to generate a combined spectral data signal. In some instances, the modulator component bins data signals from non-adjacent photodetectors. In some instances, the modulator component bins data signals from adjacent photodetectors. In certain instances, the modulator component is configured for horizontal binning of data signals from adjacent photodetectors. In some embodiments, the modulator component is configured to bin data signals from three or more different photodetector channels, such as 4 or more, such as 5 or more, such as 6 or more, such as 16 or more, such as 32 or more and including from 64 or more different photodetector channels. In some embodiments, the binned data signals are wavelength separated data signals. In some embodiments, the binned data signals are time separated data signals. In some embodiments, the binned data signals are time and wavelength separated data signals. In some embodiments, the modulator component is configured to bin the data signals from the photodetector channels based on the irradiation wavelength of each of the lasers. In some instances, the modulator component is configured to bin the data signals from the photodetector channels based on a time delay for each of the lasers.

In certain embodiments, the modulator component is configured to dynamically bin data signals from two or more different photodetector channels in real time. In certain instances, the modulator component includes an integrated circuit. For example, the integrated circuit may be a field programmable gate array (FPGA), such as where the FPGA is programmed to dynamically bin the data signals from different photodetector channels. In certain instances, the modulator component is configured to map a binning configuration for each different laser and for each photodetector channel, for example where the modulator component includes an FPGA having programming for dynamically mapping a binning configuration in real-time.

In some embodiments, the modulator component includes one or more amplifiers. In some embodiments, the amplifier component includes a plurality of amplifiers, such as transimpedence amplifiers, summing amplifiers, differential amplifiers or a combination thereof. In some instances, the modulator component includes an electronic switch (e.g., a digital switch circuit), such as where the switch is configured to multiplex or de-multiplex the output data signals from each photodetector channel. In some embodiments, one or more amplifiers in the modulator may be configured to receive multiplexed or de-multiplexed output signals from the electronic switch component or the electronic switch component may be configured to receive multiplexed or de-multiplexed output signals from one or more amplifiers. In certain instances, the amplifier component is electrically positioned between the photodetectors (e.g., photodetector array) and the electronic switch component. In other instances, light detection systems include a first amplifier component electrically positioned between the photodetectors and an electronic switch component and a second amplifier component electrically downstream from the electronic switch component. In certain embodiments, the first amplifier component includes a plurality of transimpedance amplifiers and the second amplifier component includes a plurality of differential amplifiers.

In some embodiments, light detection systems of interest include a photodetector array having N photodetector channels and an amplifier component having N transimpedance amplifiers, where N is an integer from 4 to 1000. In certain instances, the light detection system includes a photodetector array having N photodetector channels and a modulator component with N transimpedance amplifiers and an electronic switch component having an array of N×N switches. In some instances, the photodetector array may be a photodiode array having N photodiodes. The modulator component in these embodiments may include N transimpedance amplifiers and an array of N×N switches. In some embodiments, N is 8. In other embodiments, N is 16. In other embodiments, N is 32. In other embodiments, N is 64. In other embodiments, N is 128.

Aspects of the present disclosure also include systems, such as where systems are part of or operationally coupled to a particle analyzer system (e.g., a flow cytometer). Systems according to certain embodiments include a light source (e.g., one or more lasers) configured to irradiate a particle propagating through a flow stream and a light detection system with a detector component and modulator component. In some instances, the light source includes a plurality of lasers, such as where the plurality of lasers are configured to irradiate the flow stream at positions that are spaced apart from each other. In some instances, each of the lasers outputs a different wavelength of light. In some instances, the particle in the flow stream is irradiated in discrete intervals with each of the lasers, such as where each laser has an irradiation duration of from 1 μs to 50 μs. In some embodiments, the detector component includes one or more of light scatter photodetectors, fluorescence light photodetectors and light loss photodetectors. In some instances, the detector component includes a forward scatter photodetector. In some instances, the detector component includes a side scatter photodetector. In some instances, the detector component includes a back scatter photodetector. In some instances, the detector component includes one or more fluorescence photodetectors. In some instances, the detector component includes a light loss photodetector. In some instances, the detector component includes a darkfield photodetector. In some instances, the detector component includes a brightfield photodetector. In some embodiments, the subject system is a particle analyzer. In certain instances, the subject system is a flow cytometer. In certain instances, the subject system is a flow cytometer that is further configured for particle sorting.

Aspects of the present disclosure also include non-transitory computer readable storage medium for practicing the subject methods. Non-transitory computer readable storage medium according to certain embodiments includes instructions having algorithm for detecting light with a light detection system from a particle irradiated by a light source in a flow stream, algorithm for generating data signals in a plurality of photodetector channels in response to the detected light and algorithm for binning data signals from two or more different photodetector channels. In some embodiments, the non-transitory computer readable storage medium includes instructions having algorithm for generating combined spectral data signals from the binned data signals.

In embodiments, the non-transitory computer readable storage medium includes algorithm for binning data signal from different photodetector channels. In some embodiments, the non-transitory computer readable storage medium includes algorithm for dynamically binning data signals from two or more different photodetector channels to generate a combined spectral data signal. In some instances, the non-transitory computer readable storage medium includes algorithm for binning data signals from non-adjacent photodetectors. In some instances, the non-transitory computer readable storage medium includes algorithm for binning data signals from adjacent photodetectors. In certain instances, the non-transitory computer readable storage medium includes algorithm for horizontal binning of data signals from adjacent photodetectors. In some embodiments, the non-transitory computer readable storage medium includes algorithm for binning data signals from three or more different photodetector channels, such as 4 or more, such as 5 or more, such as 6 or more, such as 16 or more, such as 32 or more and including from 64 or more different photodetector channels. In some embodiments, the binned data signals are wavelength separated data signals. In some embodiments, the binned data signals are time separated data signals. In some embodiments, the binned data signals are time and wavelength separated data signals. In some embodiments, the non-transitory computer readable storage medium includes algorithm for binning the data signals from the photodetector channels based on the irradiation wavelength of each of the lasers. In some instances, the non-transitory computer readable storage medium includes algorithm for binning the data signals from the photodetector channels based on a time delay for each of the lasers.

In certain embodiments, the non-transitory computer readable storage medium includes algorithm for amplifying data signals from one or more photodetector channels. In some instances, the non-transitory computer readable storage medium includes algorithm for amplifying data signals from each photodetector channel and binning the amplified data signals. In some embodiments, the non-transitory computer readable storage medium includes algorithm for multiplexing the generated data signals. In some instances, the non-transitory computer readable storage medium includes algorithm for binning the multiplexed data signals.

In some embodiments, the non-transitory computer readable storage medium includes algorithm for irradiating the particle in the flow stream with a light source. In some instances, the light source includes a plurality of lasers, such as where the non-transitory computer readable storage medium includes algorithm for irradiating the flow stream with the plurality of lasers at positions that are spaced apart from each other. In some instances, the non-transitory computer readable storage medium includes algorithm for irradiating the particle in the flow stream in discrete intervals with each of the lasers, such as where each laser has an irradiation duration of from 1 μs to 50 μs.

In some embodiments, the non-transitory computer readable storage medium includes algorithm for binning the data signals from the photodetector channels based on the irradiation wavelength of each of the lasers. In some instances, the non-transitory computer readable storage medium includes algorithm for binning the data signals from the photodetector channels based on a time delay for each of the lasers. In certain instances, the non-transitory computer readable storage medium includes algorithm for mapping a binning configuration for each different laser and for each photodetector channel, for example where the non-transitory computer readable storage medium includes algorithm for dynamically mapping a binning configuration in real-time.

BRIEF DESCRIPTION OF THE FIGURES

The invention may be best understood from the following detailed description when read in conjunction with the accompanying drawings. Included in the drawings are the following figures:

Figure 1A:
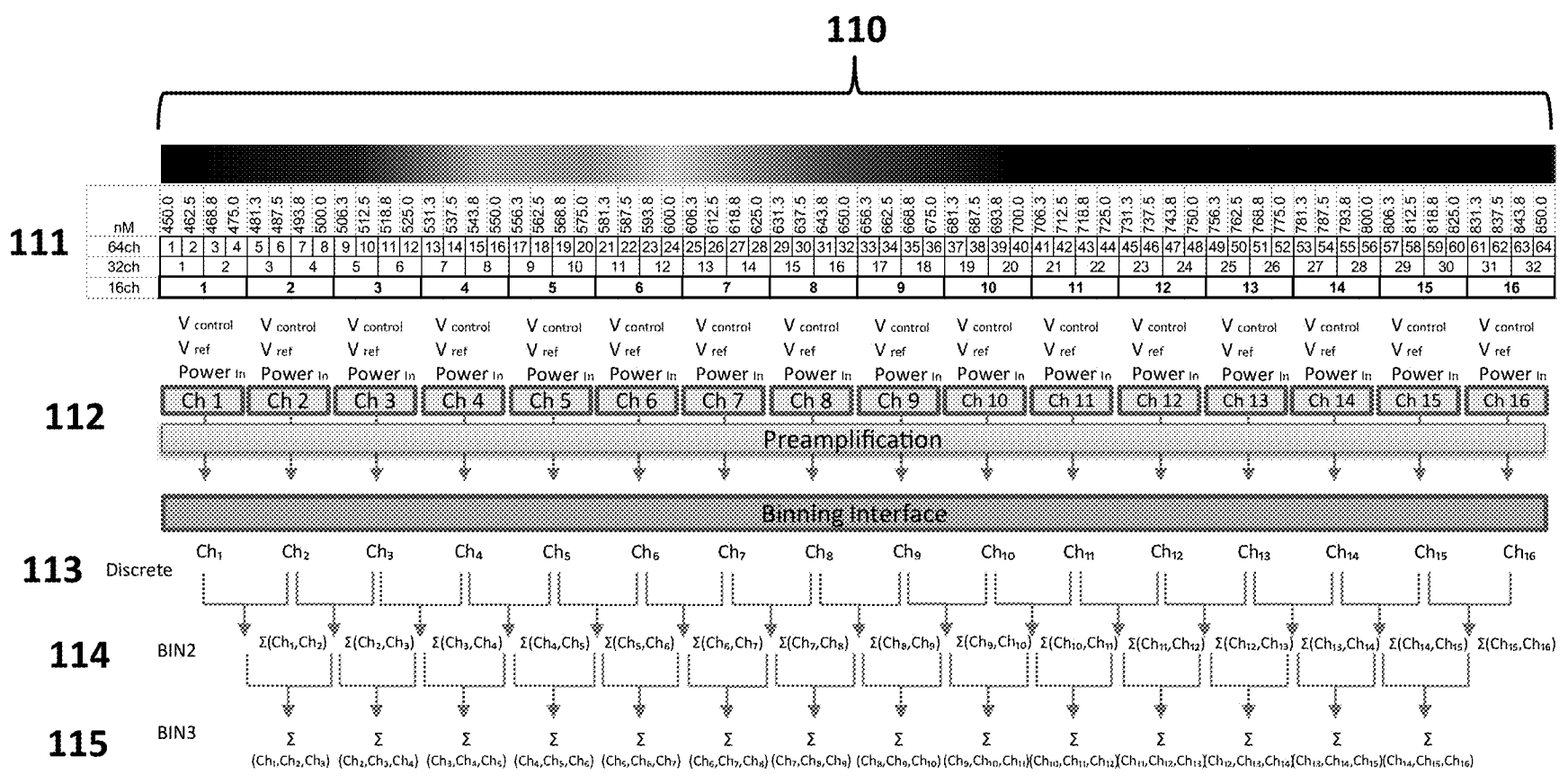

FIG. 1A depicts binning data signals from a light detection system according to certain embodiments.

FIG. 2B depicts a mapped binning configuration for data signals generated by a light detection system according to certain embodiments.

FIG. 7 depicts a block diagram of a computing system according to certain embodiments.

DETAILED DESCRIPTION

Figure 1B:
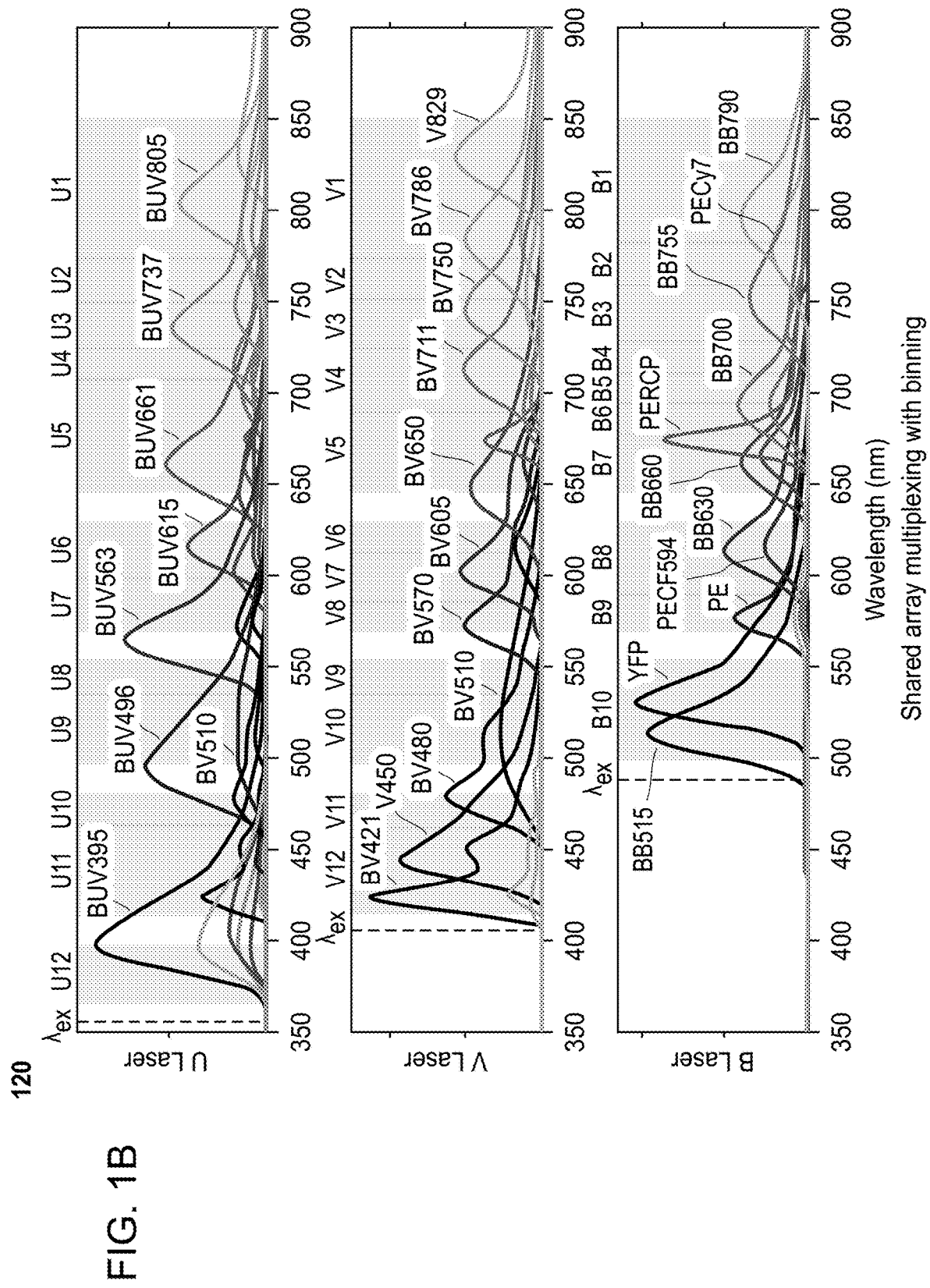
FIG. 1B depicts a comparison of multiplexed wavelength spectrum with and without binning according to certain embodiments.
Figure 1B:
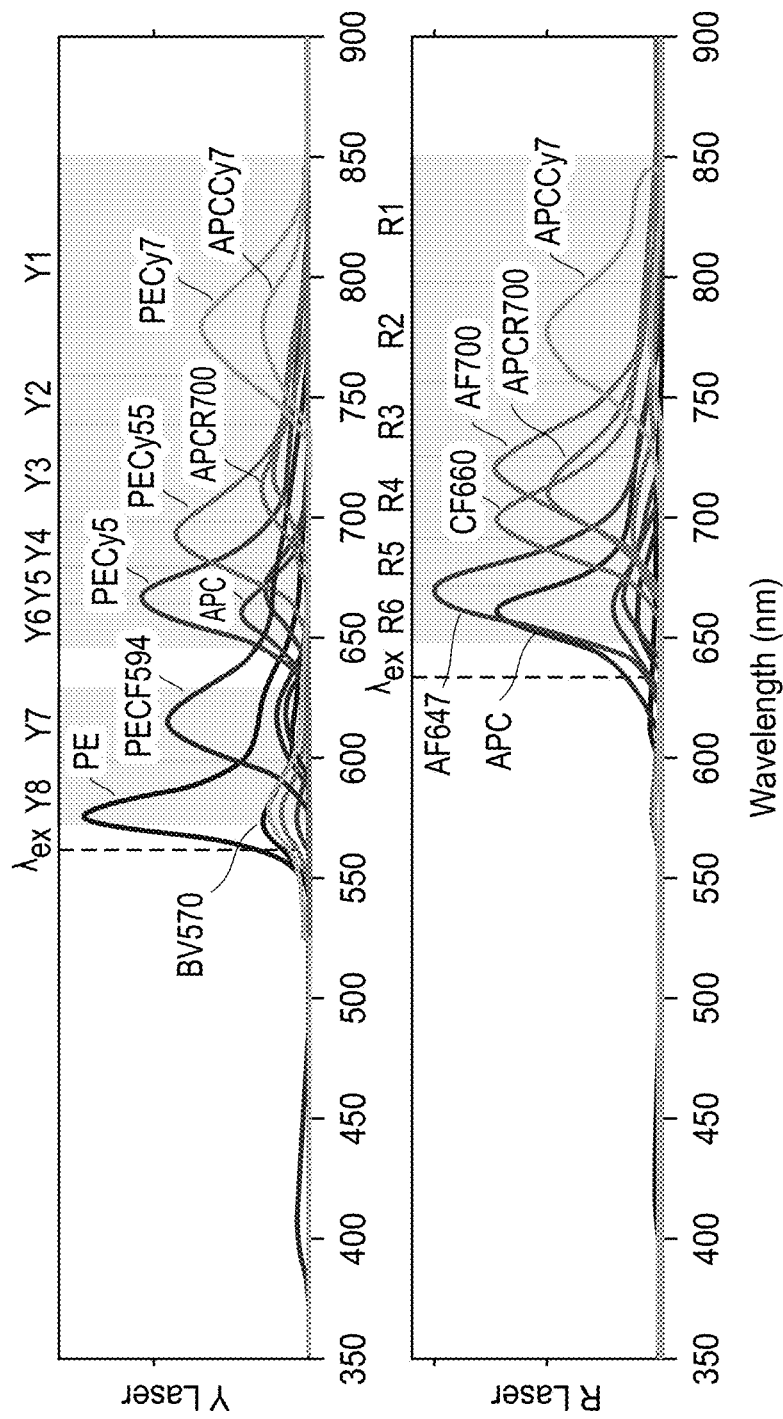
Figure 1B:
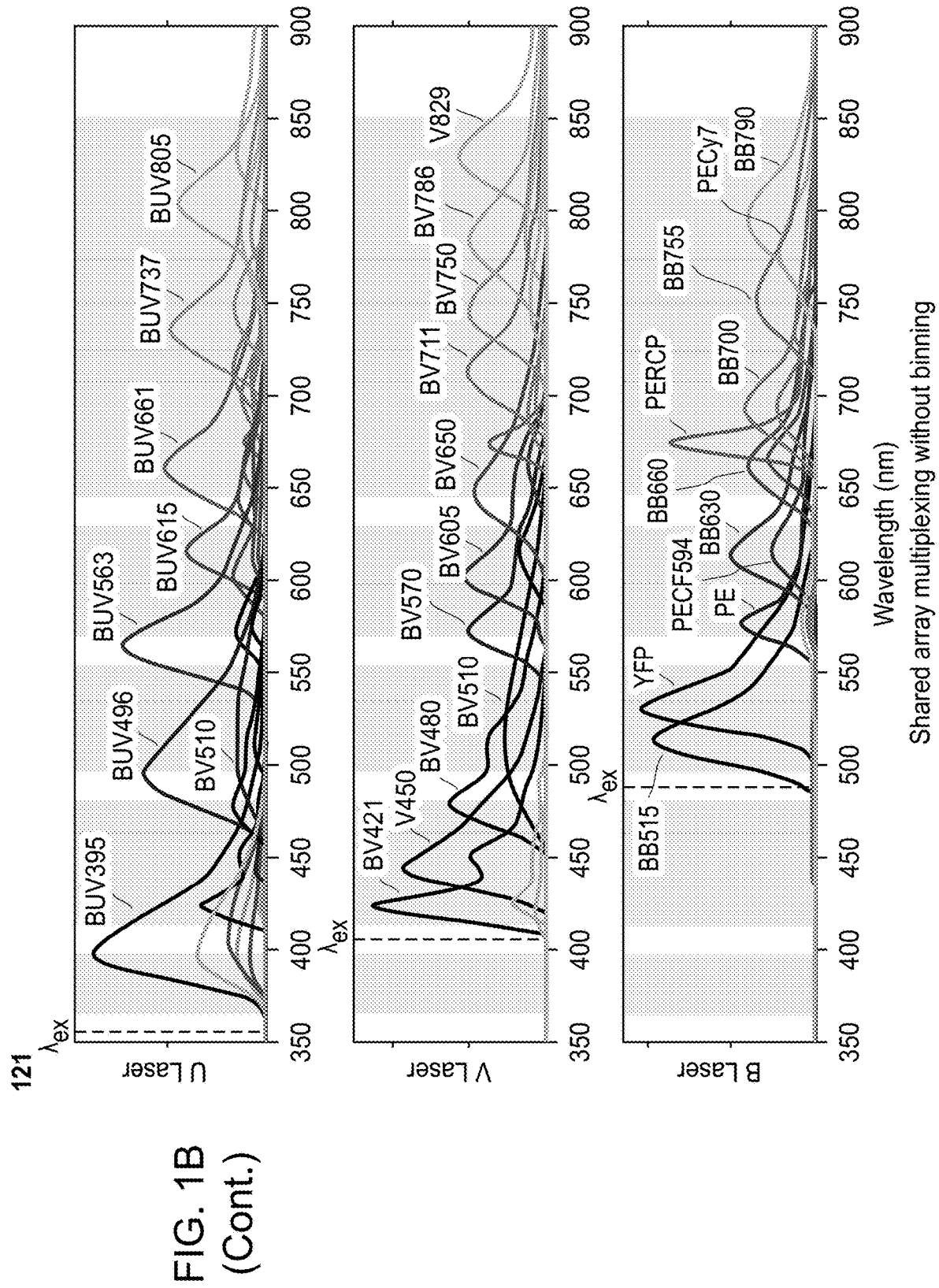
Figure 1B:
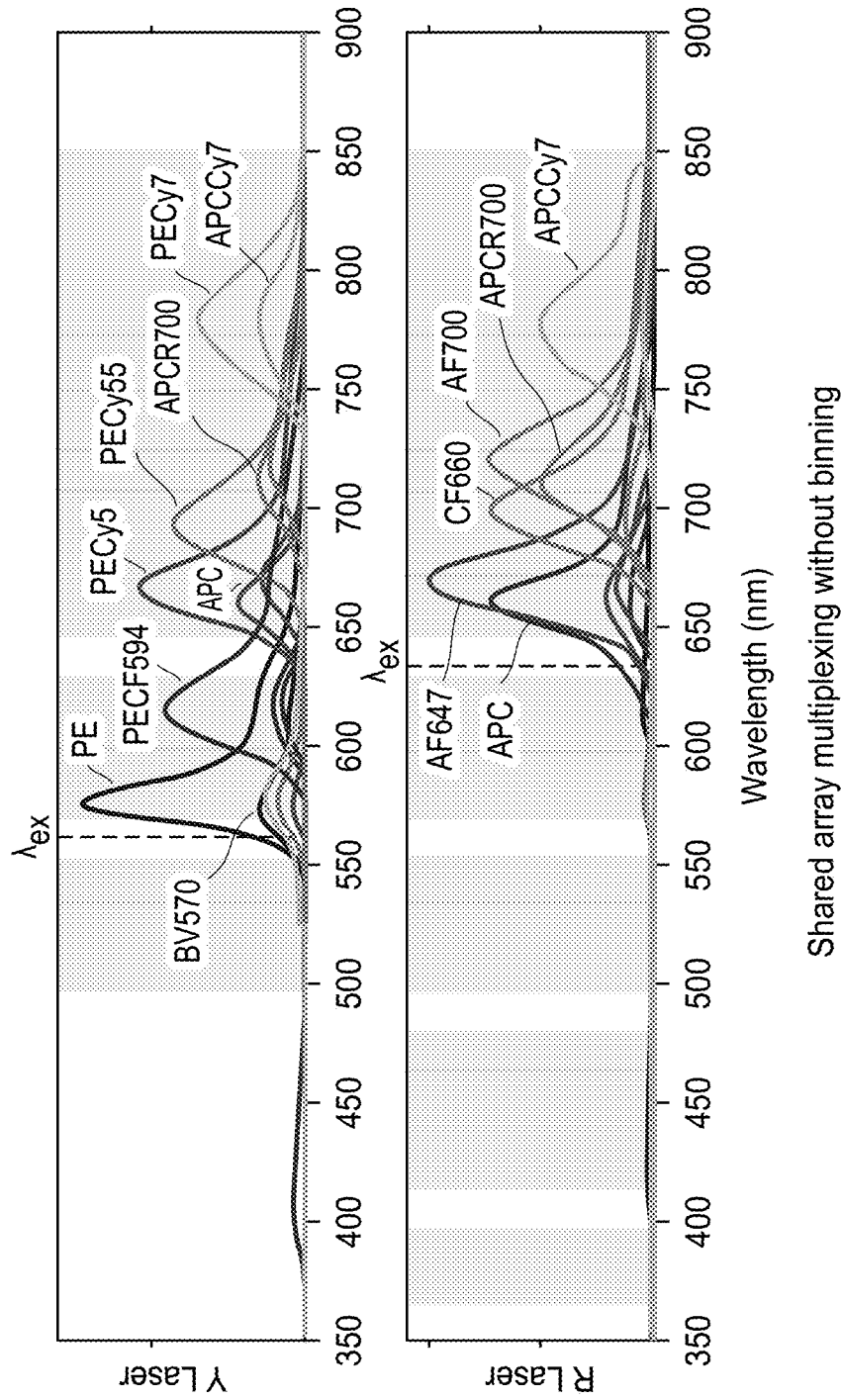

Aspects of the present disclosure include methods for array binning data signals from a photodetector (e.g., in a flow cytometer). Methods according to certain embodiments include detecting light with a light detection system from a particle irradiated by a light source in a flow stream, generating data signals in a plurality of photodetector channels in response to the detected light and binning data signals from two or more different photodetector channels to generate combined spectral data signals. Light detection systems having a detector component and a modulator component configured to bin data signals from two or more different photodetector channels are described. Systems (e.g., particle analyzer) having a light source and a light detection system for practicing the subject methods are also described. Non-transitory computer readable storage medium is also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for array binning data signals from a photodetector. In further describing embodiments of the disclosure, methods for detecting light from a particle in a flow stream, generating data signals in a plurality of photodetector channels and binning data signals from two or more different photodetector channels are first described in greater detail. Next, light detection systems that include a detector component and a modulator component configured to bin data signals from two or more different photodetector channels are provided. Systems and non-transitory computer readable storage medium for practicing the subject methods are further described.

Methods for Array Binning Flow Cytometer Data

Aspects of the present disclosure include methods for array binning data signals generated in a plurality of photodetector channels in a light detection system. In some instances, array binning provides for dynamically combining data from discrete sensor outputs (e.g., wavelength or time separated). In some embodiments, array binning flow cytometry data as described herein provides for increased precision in capturing targeted spectral emission bands by a photodetector array, such as where narrow spectrum sampling precision is increased by 5% or more as compared to signal processing without binning data signals from two or more photodetector channels, such as 10% or more, such as 15% or more, such as 25% or more, such as 50% or more, such as 75% or more, such as 90% or more and including by 95% or more. Binning data from two or more different photodetector channels according to certain embodiments provides for increased precision in narrow spectrum sampling by combining data signals from different photodetectors which detect different spectral components of the light. By binning the data signals, a greater number of wavelengths can be spectrally resolved without increasing the number of photodetectors present in the light detection system. In some embodiments, the subject methods provide for increased resolution of narrow spectral ranges of light. For example, binning data signals from a plurality of a photodetector channels as described in greater detail below can provide for greater granularity in spectrally separating light from an irradiated particle. In some embodiments, binning data signals from two or more photodetector channels as described herein increases the signal-to-noise ratio of data signals by 5% or more as compared to signal processing without binning data signals from two or more photodetector channels, such as 10% or more, such as 15% or more, such as 25% or more, such as 50% or more, such as 75% or more, such as 90% or more and including by 95% or more. Binning data signals from a plurality of photodetector channels according to certain embodiments increases the signal-to-noise ratio by allowing for the processing of data signals from a greater number of photodetector channels simultaneously. Since a greater number of data signals can be processed for a predetermined spectral width, there is an increased signal-to-noise ratio for light detected from the sample. In addition, binning data signals can increase the signal-to-noise ratio by reducing the amount of interference between the emission of the different fluorophores in the sample.

In embodiments, light from a particle irradiated by a light source in a flow stream is conveyed to a light detection system (e.g., a light detection system having a detector component that includes a photodetector configured to detect light and generate data signals in a plurality of photodetector channels and a modulator component configured to bin data signals from two or more different photodetector channels, as described in greater detail below). In practicing the subject methods according to certain embodiments, light from the sample is conveyed to the photodetectors through a wavelength separator that is configured to generate a plurality of spectral ranges of light. The term "wavelength separator" is used herein in its conventional sense to refer to an optical component that is configured to separate light collected from the sample into predetermined spectral ranges. In some embodiments, the wavelength separator is configured to spatially diffract light collected from the sample into predetermined spectral ranges. The wavelength separator may be any convenient light separation protocol, such as a spectrometer, a prism, a diffraction grating, one or more dichroic mirrors, bandpass filters or beam splitters. In certain instances, the wavelength separator includes a spectrometer. In some embodiments, the wavelength separator is configured to separate light collected from the sample into predetermined spectral ranges by passing light having a predetermined spectral range and reflecting one or more remaining spectral ranges of light. In some embodiments, the wavelength separator is configured to separate light collected from the sample into predetermined spectral ranges by passing light having a predetermined spectral range and absorbing one or more remaining spectral ranges of light. In some embodiments, the wavelength separator includes a linear variable optical filter. In some instances, the wavelength separator includes one or more linear variable bandpass filters. For example, the wavelength separator may include a long pass linear variable bandpass filter, a short pass linear variable bandpass filter or a combination of a long pass linear variable bandpass filter and a short pass linear variable bandpass filter. In other embodiments, the wavelength separator includes one or more linear variable edge filters. For example, the wavelength separator may include a long pass linear variable edge filter, a short pass linear variable edge filter or a combination of a long pass linear variable edge filter and a short pass linear variable edge filter.

In some instances, the wavelength separator generates two or more predetermined spectral ranges of light, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more predetermined spectral ranges of light. In certain instances, the wavelength separator is configured to spectrally separate a plurality of ranges of light having wavelengths from 200 nm to 1200 nm, such as from 300 nm to 1100 nm, such as from 400 nm to 1000 nm, such as from 500 nm to 900 nm, such as from 600 nm to 800 nm. In some embodiments, each predetermined spectral range may have a spectral width of 0.0001 nm or more, such as 0.0005 nm or more, such as 0.001 nm or more, such as 0.005 nm or more, such as 0.01 nm or more, such as 0.05 nm or more, such as 0.1 nm or more, such as 0.5 nm or more, such as 1 nm or more, such as 5 nm or more and including 10 nm or more. For instance, in one example each predetermined spectral range has a spectral width of 5 nm, such as where one predetermined spectral separated range of light is from 210 nm to 215 nm.

Light may be conveyed directly to the wavelength separator from the irradiated sample or through one or more optical adjustment components. In some embodiments, light is conveyed from the sample to the wavelength separator through an optical adjustment component. The term "optical adjustment" is used herein in its conventional sense to refer to any device that is capable of changing the spatial width of the light from the irradiated sample or some other characteristic of the light, such as for example, propagation direction, wavelength, beam width, beam intensity and focal spot. Optical adjustment protocols may be any convenient device which adjusts one or more characteristics of the light, including but not limited to lenses, mirrors, filters, fiber optics, wavelength separators, pinholes, slits, collimating protocols and combinations thereof. In certain embodiments, methods include conveying light from the irradiated sample through one or more focusing lenses. The focusing lens, in one example may be a de-magnifying lens. In another example, the focusing lens is a magnifying lens. In other embodiments, light is conveyed to the wavelength separator from the irradiated sample with one or more mirrors. In still other embodiments, light from the irradiated sample is conveyed to the wavelength separator with fiber optics.

Light from the particle is conveyed from the wavelength separator (e.g., spectrometer) and detected by the detector component of the light detection system. As described in greater detail below, light detection systems include one or more photodetectors, such as 2 or more, such as 3 or more, such as 4 or more, such as 5 or more, such as 6 or more, such as 7 or more, such as 8 or more, such as 9 or more and including 10 or more photodetectors. Photodetectors for practicing the subject methods may be any convenient light detecting protocol, including but not limited to photosensors or photodetectors, such as active-pixel sensors (APSs), avalanche photodiodes (APDs) quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from $0.01 \text{ cm}^2$ to $10 \text{ cm}^2$, such as from $0.05 \text{ cm}^2$ to $9 \text{ cm}^2$, such as from, such as from $0.1 \text{ cm}^2$ to $8 \text{ cm}^2$, such as from $0.5 \text{ cm}^2$ to $7 \text{ cm}^2$ and including from $1 \text{ cm}^2$ to $5 \text{ cm}^2$.

Light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. In certain instances, light from the sample is spectrally separated into 2 or more spectral ranges and each spectral range is detected in one or more photodetector channels, such as 3 or more spectral ranges, such as 4 or more, such as 8 or more, such as 16 or more, such as 32 or more, such as 64 or more, such as 128 or more, such as 256 or more and including 512 or more different spectral ranges. Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light from the light source may be taken one or more times during each discrete time interval, such as 2 or more times, such as 3 or more times, such as 5 or more times and including 10 or more times. In certain embodiments, the light from the light source is measured by the photodetector 2 or more times, with the data in certain instances being averaged.

In some instances, light detected from particles in the sample is scattered light. In some cases, the scattered light is forward scattered light. In some cases, the scattered light is backscattered light. In some cases, the scattered light is side scattered light. In some instances, light conveyed from the irradiated particle is transmitted light. In certain embodiments, light detected from each particle is emitted light, such as particle luminescence (i.e., fluorescence or phosphorescence). In these embodiments, each particle may include one or more fluorophores which emits fluorescence in response to irradiation by the two or more light sources. For example, each particle may include 2 or more fluorophores, such as 3 or more, such as 4 or more, such as 5 or more, such as 6 or more, such as 7 or more, such as 8 or more, such as 9 or more and including 10 or more fluorophores. In some instances, each particle includes a fluorophore which emits fluorescence in response to irradiation by the light source. In some embodiments, fluorophores of interest may include but are not limited to dyes suitable for use in analytical applications (e.g., flow cytometry, imaging, etc.), such as an acridine dye, anthraquinone dyes, arylmethane dyes, diarylmethane dyes (e.g., diphenyl methane dyes), chlorophyll containing dyes, triarylmethane dyes (e.g., triphenylmethane dyes), azo dyes, diazonium dyes, nitro dyes, nitroso dyes, phthalocyanine dyes, cyanine dyes, asymmetric cyanine dyes, quinon-imine dyes, azine dyes, eurhodin dyes, safranin dyes, indamins, indophenol dyes, fluorine dyes, oxazine dye, oxazone dyes, thiazine dyes, thiazole dyes, xanthene dyes, fluorene dyes, pyronin dyes, fluorine dyes, rhodamine dyes, phenanthridine dyes, as well as dyes combining two or more of the aforementioned dyes (e.g., in tandem), polymeric dyes having one or more monomeric dye units and mixtures of two or more of the aforementioned dyes thereof. A large number of dyes are commercially available from a variety of sources, such as, for example, Molecular Probes (Eugene, OR), Dyomics GmbH (Jena, Germany), Sigma-Aldrich (St. Louis, MO), Sirigen, Inc. (Santa Barbara, CA), Becton Dickinson (BD) and Company (Franklin Lakes, NJ) and Exciton (Dayton, OH). For example, the fluorophore may include 4-acetamido-4'-isothiocyanatostilbene-2,2'disulfonic acid; acridine and derivatives such as acridine, acridine orange, acridine yellow, acridine red, and acridine isothiocyanate; allophycocyanin (APC), phycoerythrin (PE), peridinin-chlorophyll protein, 5-(2'-aminoethyl)aminonaphthalene-1-sulfonic acid (EDANS); 4-amino-N-[3-vinylsulfonyl)phenyl]naphthalimide-3,5 disulfonate (Lucifer Yellow VS); N-(4-anilino-1-naphthyl)maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy3.5, Cy5, Cy5.5, and Cy7; 4',6-diaminidino-2-phenylindole (DAPI); 5',5''-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl)aminofluorescein (DTAF), 2'7'-dimethoxy-4'5'-dichloro-6-carboxyfluorescein (JOE), fluorescein isothiocyanate (FITC), fluorescein chlorotriazinyl, naphthofluorescein, and QFITC (XRITC); fluorescamine; IR144;

IR1446; Green Fluorescent Protein (GFP); Reef Coral Fluorescent Protein (RCFP); Lissamine™; Lissamine rhodamine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin; o-phthaldialdehyde; pyrene and derivatives such as pyrene, pyrene butyrate and succinimidyl 1-pyrene butyrate; Reactive Red 4 (Cibacron™ Brilliant Red 3B-A); rhodamine and derivatives such as 6-carboxy-X-rhodamine (ROX), 6-carboxyrhodamine (R6G), 4,7-dichlororhodamine lissamine, rhodamine B sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhodamine isothiocyanate (TRITC); riboflavin; rosolic acid and terbium chelate derivatives; xanthene; dye-conjugated polymers (i.e., polymer-attached dyes) such as fluorescein isothiocyanate-dextran as well as dyes combining two or more dyes (e.g., tandem dyes or protein complex tandem dyes) such as phycoerythrin (PE) tandem dyes or allophycocyanin (APC) tandem dyes, for example phycoerythrin-CF594 (PE-CF594) tandem, phycoerythrin-cyanine 5 tandem (PE-Cy5), phycoerythrin-cyanine 5.5 tandem (PE-Cy5.5), phycoerythrin-cyanine 7 tandem (PE-Cy7), allophycocyanin-R700 tandem (APC-R700), allophycocyanin-cyanine 7 (APC-Cy7), polymeric dyes having one or more monomeric dye units and mixtures of two or more of the aforementioned dyes or combinations thereof.

In some instances, the fluorophore is polymeric dye. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where π-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. The structural characteristics of the polymeric dyes can have an effect on the fluorescence properties of the molecules.

Polymeric dyes of interest include, but are not limited to, those dyes described by Gaylord et al. in U.S. Publication Nos. 20040142344, 20080293164, 20080064042, 20100136702, 20110256549, 20110257374, 20120028828, 20120252986, 20130190193, 20160264737, 20160266131, 20180231530, 20180009990, 20180009989, and 20180163054, the disclosures of which are herein incorporated by reference in their entirety; and Gaylord et al., J. Am. Chem. Soc., 2001, 123 (26), pp 6417-6418; Feng et al., Chem. Soc. Rev., 2010, 39, 2411-2419; and Traina et al., J. Am. Chem. Soc., 2011, 133 (32), pp 12600-12607, the disclosures of which are herein incorporated by reference in their entirety.

The polymeric dye may have one or more desirable spectroscopic properties, such as a particular absorption maximum wavelength, a particular emission maximum wavelength, extinction coefficient, quantum yield, and the like (see e.g., Chattopadhyay et al., "Brilliant violet fluorophores: A new class of ultrabright fluorescent compounds for immunofluorescence experiments." Cytometry Part A, 81A (6), 456-466, 2012). In some embodiments, the polymeric dye has an absorption curve between 280 nm and 475 nm.

In certain embodiments, the polymeric dye has an absorption maximum (excitation maximum) in the range 280 nm and 475 nm. In some embodiments, the polymeric dye absorbs incident light having a wavelength in the range between 280 nm and 475 nm. In some embodiments, the polymeric dye has an emission maximum wavelength ranging from 400 nm to 850 nm, such as 415 nm to 800 nm, where specific examples of emission maxima of interest include, but are not limited to: 421 nm, 510 nm, 570 nm, 602 nm, 650 nm, 711 nm and 786 nm. In some instances, the polymeric dye has an emission maximum wavelength in a range selected from the group consisting of 410 nm to 430 nm, 500 nm to 520 nm, 560 nm to 580 nm, 590 nm to 610 nm, 640 nm to 660 nm, 700 nm to 720 nm, and 775 nm to 795 nm. In certain embodiments, the polymeric dye has an emission maximum wavelength of 421 nm. In some instances, the polymeric dye has an emission maximum wavelength of 510 nm. In some cases, the polymeric dye has an emission maximum wavelength of 570 nm. In certain embodiments, the polymeric dye has an emission maximum wavelength of 602 nm. In some instances, the polymeric dye has an emission maximum wavelength of 650 nm. In certain cases, the polymeric dye has an emission maximum wavelength of 711 nm. In some embodiments, the polymeric dye has an emission maximum wavelength of 786 nm. In certain instances, the polymeric dye has an emission maximum wavelength of 421 nm±nm. In some embodiments, the polymeric dye has an emission maximum wavelength of 510 nm±5 nm. In certain instances, the polymeric dye has an emission maximum wavelength of 570 nm±5 nm. In some instances, the polymeric dye has an emission maximum wavelength of 602 nm±5 nm. In some embodiments, the polymeric dye has an emission maximum wavelength of 650 nm±5 nm. In certain instances, the polymeric dye has an emission maximum wavelength of 711 nm±5 nm. In some cases, the polymeric dye has an emission maximum wavelength of 786 nm±5 nm. In certain embodiments, the polymeric dye has an emission maximum selected from the group consisting of 421 nm, 510 nm, 570 nm, 602 nm, 650 nm, 711 nm and 786 nm.

Specific polymeric dyes that may be employed include, but are not limited to, BD Horizon Brilliant™ Dyes, such as BD Horizon Brilliant™ Violet Dyes (e.g., BV421, BV480, BV510, BV570, BV605, BV650, BV711, BV786, BV829); BD Horizon Brilliant™ Ultraviolet Dyes (e.g., BUV395, BUV496, BUV563, BUV615, BUV661, BUV737, BUV805); and BD Horizon Brilliant™ Blue Dyes (e.g., BB515, BB630, BB660, BB700, BB755, BB790) (BD Biosciences, San Jose, CA).

Light from the particle is detected in two or more photodetector channels, such as 4 or more, such as 8 or more, such as 12 or more, such as 16 or more, such as 20 or more, such as 24 or more, such as 28 or more, such as 32 or more, such as 36 or more, such as 40 or more, such as 44 or more, such as 48 or more, such as 52 or more, such as 56 or more, such as 60 or more and including in 64 or more photodetector channels. In some embodiments, methods include generating a photodetector signal pulse in response to light detected from the wavelength separator. In some embodiments, methods include generating one or more signal pulses in each photodetector channel in response to detected light. In some instances, methods include generating a plurality of data signals in each photodetector channel in response to the detected light, such as generating 2 or more data signals, such as 3 or more data signals, such as 4 or more data signals, such as 5 or more data signals, such as 6 or more data signals, such as 7 or more data signals, such as 8 or more data signals, such as 9 or data signals and including generating 10 or more data signals in each photodetector channel in response to the detected light. In some instances, the methods include generating one or more data signals in a different photodetector channel in response to light detected from the particle across the wavelength separator.

Depending on the spectral width of each predetermined spectral range of light (e.g., generated by the wavelength separator component as described above) and the number of photodetector channels being employed, light from one or more spectral ranges is detected in each photodetector channel, such as 2 or more spectral ranges, such as 3 or more and including detecting 4 or more different spectral ranges in each photodetector channel. In embodiments, one or more data signals are generated in each of the photodetector channels in response to the detected light, such as 2 or more data signals, such as 4 or more, such as 8 or more, such as 16 or more and including generating 32 or more data signals in each photodetector channel in response to the detected light.

In practicing the subject methods, data signals from two or more different photodetector channels are binned. The term binning data signals is used herein in its conventional sense to refer to the discrete grouping or bucketing of raw data values into a predetermined interval (i.e., a bin) or combining data signals from different photodetector channels as a form of quantization of the data signals. In certain embodiments, data signals from two or more different photodetector channels are binned to generate combined spectral data signals. Methods include binning together data signals from two or more different photodetector channels, such as 3 or more, such as 4 or more and including from 8 more different photodetector channels. In some instances, methods include binning data signals from non-adjacent photodetectors. In other instances, methods include binning data signals from adjacent photodetectors. In certain instances, methods include horizontal binning of adjacent photodetectors. In certain embodiments, methods include dynamically binning data signals from two or more different photodetector channels in real time.

In some instances, data signals generated in different photodetector channels in response to wavelengths of light within a predetermined spectral range are binned together. For example, methods may include binning together data signals from photodetector channels corresponding to detected light having wavelengths which range from 450 nm to 475 nm, from 475 nm to 500 nm, from 500 nm to 525 nm, from 525 nm to 550 nm, from 550 nm to 575 nm, from 575 nm to 600 nm, from 600 nm to 625 nm, from 625 nm to 650 nm, from 650 nm to 675 nm, from 675 nm to 700 nm, from 700 nm to 725 nm, from 725 nm to 750 nm, from 750 nm to 775 nm, from 775 nm to 800 nm, from 800 nm to 825 nm and from 825 nm to 850 nm. Depending on the number of photodetector channels employed by the photodetectors of the light detection system, methods may include binning data signals from different photodetector channels that are generated in response to wavelengths of light within a spectral range of 5 nm, such as nm, such as 15 nm, such as 20 nm, such as 25 nm, such as 30 nm, such as 35 nm, such as 40 nm, such as 45 nm and including binning data signals from different photodetector channels that are within a predetermined spectral range of 50 nm.

In other instances, data signals generated in different photodetector channels in response to wavelengths of light emitted from a specific fluorophore are binned together. For example, the data signals generated in different photodetector channels in response to light emitted from a first ultraviolet dye (e.g., BUV496) may be binned together and data signals from different photodetector channels generated in response to light emitted from a second ultraviolet dye (e.g., BUV563) may be binned together.

In some instances, methods include further binning the binned data signals, such as where data signals from 2 or more different bins are grouped together to form a hierarchy of data signal bins. In some embodiments, methods include generating 2 or more different hierarchy levels of data signal bins (e.g., BIN2, BIN3, BIN4, etc.), such as 3 or more, such as 4 or more, such as 5 or more, such as 6 or more, such as 7 or more and including 8 or more different levels of data signal bins. For instance, in embodiments where two adjacent photodetector channels are binned together (e.g., to combine data signals in a predetermined spectral width), two or more of these bins may be further binned together in order to generate data signals bins having an extended spectral width. In one example, a first set of bins combines the data signals from two adjacent photodetector channels (e.g., $\Sigma(Ch_1,Ch_2)$; $\Sigma(Ch_2,Ch_3)$; $\Sigma(Ch_3,Ch_4)$, etc.). A second set of bins is generated by combining data signals from two different bins such that the second set of bins combines data signals from three different photodetector channels (e.g., $\Sigma(Ch_1,Ch_2,Ch_3)$; $\Sigma(Ch_2,Ch_3,Ch_4)$, etc.) By doing this, in certain instances data signals across overlapping spectral widths can be processed simultaneously (e.g., without a need to increase data processing burden on the system).

In certain embodiments, data signals from one or more photodetector channels are pre-amplified. In some instances, data signals may be pre-amplified in order to increase the signal-to-noise ratio of the data signal. In certain instances, data signals may be pre-amplified so that the amplitude of the data signals being binned together are or are about the same as each other. For example, methods may include pre-amplifying data signals from one or more of the photodetector channels such that the amplitude of data signals binned together are within 10% or less of each other, such as 9% or less, such as 8% or less, such as 7% or less, such as 6% or less, such as 5% or less, such as 4% or less, such as 3% or less, such as 2% or less and including where the amplitude of the data signals are within 1% or less of each other. In some instances, methods include amplifying data signals from each photodetector channel and binning the amplified data signals. In embodiments, the data signals may be generated in 4 or more photodetector channels, such as 8 or more photodetector channels, such as 16 or more photodetector channels, such as 32 or more photodetector channels and including in 64 or more photodetector channels.

FIG. 1A depicts binning data signals from a light detection system according to certain embodiments. Light from an irradiated sample is spectrally separated across a range of wavelengths 110 with a wavelength separator. Light is detected in a plurality of photodetector channels where each predetermined spectral range is detected in one or more photodetector channels. FIG. 1A depicts at 111 detecting light from 450 nm to 850 nm in 1) 64 photodetector channels (e.g., a spectral range having a spectral width of 6.25 nm is detected in each photodetector channel); 2) 32 photodetector channels (e.g., a spectral range having a spectral width of 6.25 nm is detected in each photodetector channel); or 16 photodetector channels (e.g., a spectral range having a spectral width of nm is detected in each photodetector channel). Step 112 depicts generating data signals in 16 photodetector channels and pre-amplifying the data signals from each photodetector channel (e.g., using a transimpedance amplifier circuit as described in detail below). Data signals from adjacent photodetector channels are binned by discrete binning at step 113 (i.e., data signals from channel 1 are binned together with data signals from channel 2; data signals from channel 2 are binned together with data signals from channel 3, etc.). The binned data signals may be further summed together at steps 114 and 115 creating two different binning levels (BIN2 and BIN3). As shown in FIG. 1A, the binned data may include data signals from two or more photodetector channels, such as in BIN3 where data signals from 3 different adjacent photodetector channels are binned together (e.g., $\Sigma(Ch_1, Ch_2, Ch_3)$; $\Sigma(Ch_2, Ch_3, Ch_4)$; $\Sigma(Ch_3, Ch4, Ch5)$, etc.)

In some embodiments, methods include multiplexing data signals generated in one or more of the photodetector channels. The term multiplexing is used herein in its conventional sense to refer to combining two or more data signals generated in a photodetector channel, such as based on the wavelength of light or by time discrimination. In some instances, data signals generated in a photodetector channel in response to wavelengths of light within a predetermined spectral range are multiplexed together. In other instances, data signals that are generated in a photodetector channel within a predetermined time frame are multiplexed together. In some instances, the multiplexed data signals are binned. In some embodiments, the multiplexed data signals are wavelength separated data signals. In some embodiments, the multiplexed data signals are time separated data signals. In some embodiments, the multiplexed data signals are time and wavelength separated data signals. In some embodiments, methods include receiving data signals from a plurality of photodetector channels with an electronic switch component and differentially propagating the signals from the photodetector channels to the amplifier component. For example, methods may include differentially propagating signals from one or more of the photodetector channels, such as signals from 2 or more photodetector channels, such as signals from 3 or more photodetector channels, such as signals from 4 or more photodetector channels, such as signals from 8 or more photodetector channels, such as signals from 16 or more photodetector channels, such as signals from 32 or more photodetector channels and including differentially propagating signals from 64 or more photodetector channels. In certain embodiments, methods include differentially propagating, with the electronic switch component, signals from two or more photodetector channels to a second amplifier component.

In other embodiments, methods include receiving amplified signals with the electronic switch component from a first amplifier component (e.g., a pre-amplifier). In some instances, the signals from the first amplifier component are signals which are directly propagated to the first amplifier component from the photodetectors. In other embodiments, the electronic switch component is configured to differentially propagate the amplified signals from the first amplifier component (e.g., having a plurality of transimpedance amplifiers) to a second amplifier component (e.g., having a plurality of differential amplifiers). In some instances, methods include combining one or more amplified signals with the electronic switch components, such as 2 or more amplified signals, such as 3 or more amplified signals, such as 4 or more amplified signals, such as 6 or more amplified signals, such as 8 or more amplified signals, such as 16 or more amplified signals, such as 32 or more amplified signals and including 64 or more amplified signals. FIG. 1B depicts a comparison of multiplexed wavelength spectrum with and without binning according to certain embodiments. The spectra in FIG. 1B depict the irradiation with 5 different lasers (each having different irradiation wavelengths) of a sample having a plurality of different fluorophores and detection of light with a shared photodetector array. Spectra 120 depict spectra generated through multiplexing with binning data signals from the photodetector channels. Spectra 121 depict spectra generated through multiplexing the data signals without binning data signals from the photodetector channels. Shared array multiplexing has the constraint of fixed optical bands providing for specific spectrum sampling.

Methods according to certain embodiments include irradiating the sample (e.g., in a flow stream of a flow cytometer) with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In some embodiments, the methods include irradiating the sample in the flow stream with a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, methods may include irradiating the sample in the flow stream with a continuous light source that provides for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In other embodiments, the methods include irradiating the sample propagating through the flow stream with a pulsed light source, such as where light is emitted at predetermined time intervals, each time interval having a predetermined irradiation duration (i.e., pulse width). In certain embodiments, methods include irradiating the particle with the pulsed light source in each interrogation region of the flow stream with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 m or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013), as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

The sample may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers. In some instances, the light source includes a plurality of lasers, such as where the plurality of lasers are configured to irradiate the flow stream at positions that are spaced apart from each other. For example, the light source may include 2 or more lasers that are spaced apart from each other along a longitudinal axis of the flow stream, such as 3 or more, such as 4 or more, such as 5 or more, such as 6 or more, such as 7 or more, such as 8 or more, such as 9 or more and including 10 or more lasers that are spaced apart from each other along a longitudinal axis of the flow stream. In certain embodiments, each of the plurality of lasers is spaced apart from each other (e.g., such that each laser irradiates a different part of the flow stream) by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more, such as by 20 mm or more, such as by 30 mm or more, such as by 40 mm or more, such as by 50 mm or more and including by 100 mm or more. Depending on the flow rate of the particle through the flow stream, the time separation between irradiation of the particle by each laser may be from 0.001 µs 500 µs, such as from 0.005 µs to 400 µs, such as from 0.01 µs to 300 µs, such as from 0.05 µs to 200 µs, such as from 0.1 µs to 100 µs, such as from 0.5 µs to 75 µs and including from 1 µs to 50 µs.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

In some embodiments, methods include binning the data signals from the photodetector channels based on the irradiation wavelength of each of the light sources used to irradiate the sample. For example, data signals from the photodetector channels may be binned based on the laser used to irradiate the sample, such as where data signals generated in response to light irradiated by a first laser are differentially binned from data signals which are generated in response to light irradiated by a second laser. In some instances, the data signals from the photodetector channels are binned based on a time delay for each of the lasers. In some embodiments, methods include differentially binning the data signals using the time delay between irradiation of the sample with each of the different lasers. In some embodiments, data signals generated during a predetermined time window after irradiation of the sample with a laser are binned, such as time windows having a duration of from 0.0001 µs to 50 µs, such as from 0.0005 µs to 45 µs, such as from 0.001 µs to 40 µs, such as from 0.005 µs to 35 µs, such as from 0.01 µs to 30 µs, such as from 0.05 µs to 25 µs, such as from 0.1 µs to µs, such as from 0.5 µs to 15 µs and including data signals generated during a predetermined time window having a duration from 1 µs to 10 µs.

Figure 2A:
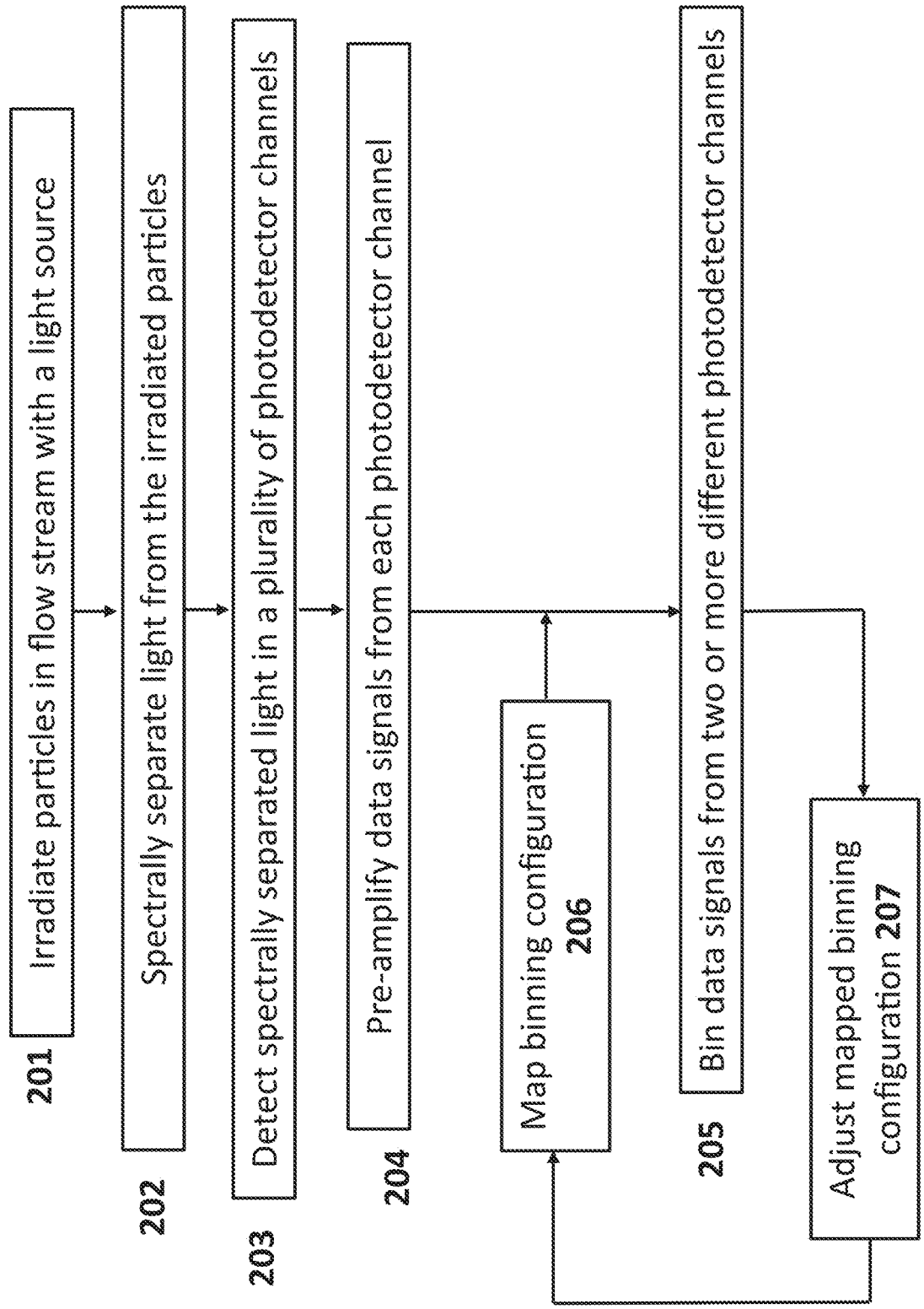
FIG. 2A depicts a flow chart for array binning data signals from plurality of photodetector channels according to certain embodiments.

FIG. 2A depicts a flow chart for array binning flow cytometer data according to certain embodiments. At step 201, a sample having particles in a flow stream is irradiated with a light source (e.g., an array of lasers). The light from the particles is in certain instances wavelength separated (step 202) to generate a plurality of predetermined spectral ranges. As described above, each spectral range may be detected in a different photodetector channel such as where light from the particles in the sample are spectrally separated into 64 different predetermined spectral ranges and each spectral range is detected in a different photodetector channel (i.e., 64 different photodetector channels). Light from the particles is detected in a plurality of photodetector channels of a light detection system at step 203. Data signals from each of the photodetector channels may be pre-amplified at step 204, such as with a transimpedance amplifier. At step 205, the data signals from two or more different photodetector channels are binned. In some instances, the data signals are binned based on a mapped binning configuration (206). In certain instances, the binning configuration may be dynamically mapped in real time or a predetermined binning configuration may be adjusted (207).

In some embodiments, methods include mapping a binning configuration for the generated data signals before irradiating the sample with the light source. In some instances, the binning configuration is mapped for each photodetector channel in the light detection system. For example, where the light detection system includes 64 photodetector channels, the configuration for binning photodetector data signals generated in each of photodetector channels $Ch_1$-$Ch_{64}$ are mapped before irradiating the sample with the light source. In other embodiments, the binning configuration for each photodetector channel may be dynamically mapped in real time. In these embodiments, a sample is irradiated with the light source and data signals generated in the photodetector channels are binned based on a configuration which is mapped while the data signals are being collected. In certain embodiments, a binning configuration is mapped for each photodetector before irradiating the sample, but is dynamically adjusted in while collecting data signals from each of the photodetector channels. In certain embodiments, the binning configuration for each photodetector channel is mapped based on one or more of the irradiation wavelength of each of the lasers and the time delay for each of the lasers.

The binning configuration may be mapped in some embodiments to combine data signals that are generated in different photodetector channels in response to wavelengths of light within a predetermined spectral range. For example, a binning configuration may be mapped so that data signals from photodetector channels corresponding to detected light having wavelengths which range from 450 nm to 475 nm are binned together, such as from 475 nm to 500 nm, such as from 500 nm to 525 nm, such as from 525 nm to 550 nm, such as from 550 nm to 575 nm, such as from 575 nm to 600 nm, such as from 600 nm to 625 nm, such as from 625 nm to 650 nm, such as from 650 nm to 675 nm, such as from 675 nm to 700 nm, such as from 700 nm to 725 nm, such as from 725 nm to 750 nm, such as from 750 nm to 775 nm, such as from 775 nm to 800 nm, such as from 800 nm to 825 nm and such as from 825 nm to 850 nm. In some embodiments, the binning configuration is mapped such that data signals generated in different photodetector channels in response to light within a spectral range of 5 nm are binned together, such as 10 nm, such as 15 nm, such as 20 nm, such as 25 nm, such as 30 nm, such as 35 nm, such as 40 nm, such as 45 nm and including within a spectral range of 50 nm. In some instances, the binning configuration map is adjusted based on a change in the predetermined spectral range, for example where a first map provides for binning data signals generated in different photodetector channels in response to light within a spectral range of 25 nm and the adjusted map provides for binning data signals generated in different photodetector channels in response to light within a spectral range of 12.5 nm. This adjustment is made in certain instances in response to an increase in the number of photodetector channels being employed by the light detection system (e.g., increasing the number of photodetector channels from 16 channels to 32 channels)

In other instances, the binning configuration is mapped so that data signals generated in different photodetector channels in response to wavelengths of light emitted from a specific fluorophore are binned together. For example, the data signals generated in different photodetector channels in response to light emitted from a first ultraviolet dye (e.g., BUV496) may be binned together and data signals generated in different photodetector channels in response to light emitted from a second ultraviolet dye (e.g., BUV563) may be binned together.

FIG. 2B depicts a mapped binning configuration for data signals generated by a light detection system according to certain embodiments. FIG. 2B summarizes a binning protocol for a 16-photodetector channel and 32-photodetector channel light detection system. In this embodiment, a sample is irradiated with 5 lasers having different irradiation wavelengths (UV laser, violet laser, blue laser, yellow-green laser and red laser). The configuration for binning data signals from each of the photodetector channels is mapped at column 4 (16 channels) and column 5 (32 channels). In certain instances, as shown in FIG. 2A data signals generated in response to the fluorescence from different fluorophores are binned together (e.g., data signals generated from fluorescence from fluorophore BUV496 are binned together (Ch$_2$ and Ch$_3$ of the 16-channel system and Ch$_2$, Ch$_3$, Ch$_4$ and Ch$_5$ of the 32-channel system)). Here, the binning configuration is set out so that data signals generated in different photodetector channels in response to light from different fluorophores are binned together. By doing so, the data signals for each individual fluorophore can be processed together which reduces the amount of interference from the emission of the other fluorophores in the sample.

Light Detections Systems

Aspects of the present disclosure include light detection systems. In embodiments, light detection systems include a detector component having a photodetector configured to detect light from a particle irradiated in a flow stream and to generate data signals in a plurality of photodetector channels in response to the detected light and a modulator component configured to bin data signals from two or more different photodetector channels. In some embodiments, the detector component includes one or more of light scatter photodetectors, fluorescence light photodetectors and light loss photodetectors. In some instances, the detector component includes a forward scatter photodetector. In some instances, the detector component includes a side scatter photodetector. In some instances, the detector component includes a back scatter photodetector. In some instances, the detector component includes one or more fluorescence photodetectors. In some instances, the detector component includes a light loss photodetector. In some instances, the detector component includes a darkfield photodetector. In some instances, the detector component includes a brightfield photodetector.

The photodetectors of the subject light detection systems may by any photosensor, such as active-pixel sensors (APSs), avalanche photodiode (APDs), image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors.

In some embodiments, the light detection system includes two or more photodetectors, such as 3 or more, such as 4 or more, such as 5 or more and including or more photodetectors. In some instances, the photodetectors form a photodetector array. The term "photodetector array" is used in its conventional sense to refer to an arrangement or series of two or more photodetectors that are configured to detect light. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. In certain embodiments, photodetector arrays include 5 photodetectors. The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. In embodiments, the detector component is configured to generate data signals in 4 or more photodetector channels, such as 16 or more, such as 32 or more and including in 64 or more photodetector channels. In some embodiments, the detector component is configured to generate data signals in one or more photodetector channels for each separated spectral component of light. In some instances, adjacent spectral components of the light generate data signals in adjacent photodetector channels. In some instances, adjacent spectral components of the light generate data signals in non-adjacent photodetector channels.

In certain embodiments, light detection systems of interest include a photodiode array having more than one photodiode, such as two or more photodiodes, such as three or more, such as five or more and including 10 or more photodiodes, where each photodiode may have an active detecting surface area of each region that ranges from 0.01

$cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In embodiments of the present disclosure, photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. In embodiments, the photodetectors are configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, light detection systems include a wavelength separator configured to spectrally separate light from the sample into a plurality of spectral ranges of light. The wavelength separator in certain instances is an optical component that is configured to separate light collected from the sample into predetermined spectral ranges. In some embodiments, the wavelength separator is configured to spatially diffract light collected from the sample into predetermined spectral ranges. The wavelength separator may be any convenient light separation protocol, such as a spectrometer, a prism, a diffraction grating, one or more dichroic mirrors, bandpass filters or beam splitters. In certain instances, the wavelength separator includes a spectrometer.

In some instances, the wavelength separator generates two or more predetermined spectral ranges of light, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more predetermined spectral ranges of light. In certain instances, the wavelength separator is configured to spectrally separate a plurality of ranges of light having wavelengths from 200 nm to 1200 nm, such as from 300 nm to 1100 nm, such as from 400 nm to 1000 nm, such as from 500 nm to 900 nm, such as from 600 nm to 800 nm. In some embodiments, each predetermined spectral range may have a spectral width of 0.0001 nm or more, such as 0.0005 nm or more, such as 0.001 nm or more, such as 0.005 nm or more, such as 0.01 nm or more, such as 0.05 nm or more, such as 0.1 nm or more, such as 0.5 nm or more, such as 1 nm or more, such as 5 nm or more and including 10 nm or more. For instance, in one example each predetermined spectral range has a spectral width of 5 nm, such as where one predetermined spectral separated range of light is from 210 nm to 215 nm.

In certain embodiments, the wavelength separator is configured to separate light collected from the sample into predetermined spectral ranges by passing light having a predetermined spectral range and reflecting one or more remaining spectral ranges of light. In some embodiments, the wavelength separator is configured to separate light collected from the sample into predetermined spectral ranges by passing light having a predetermined spectral range and absorbing one or more remaining spectral ranges of light. In some embodiments, the wavelength separator includes a linear variable optical filter. In some instances, the wavelength separator includes one or more linear variable bandpass filters. For example, the wavelength separator may include a long pass linear variable bandpass filter, a short pass linear variable bandpass filter or a combination of a long pass linear variable bandpass filter and a short pass linear variable bandpass filter. In other embodiments, the wavelength separator includes one or more linear variable edge filters. For example, the wavelength separator may include a long pass linear variable edge filter, a short pass linear variable edge filter or a combination of a long pass linear variable edge filter and a short pass linear variable edge filter.

In certain embodiments, the long pass linear variable bandpass filter is a linear variable bandpass filter which passes wavelengths of light across the bandpass filter that are greater than 400 nm, greater than 450 nm, greater than 500 nm, greater than 550 nm, greater than 600 nm, greater than 650 nm, greater than 700 nm, greater than 750 nm, greater than 800 nm. In certain instances, the wavelength separator includes a short pass linear variable bandpass filter. In certain embodiments, the short pass linear variable bandpass filter is a linear variable linear variable bandpass filter which passes wavelengths of light across the bandpass filter that are 600 nm or less, 550 nm or less, 500 nm or less, 450 nm or less, 400 nm or less, 350 nm or less, 300 nm or less, 250 nm or less, 200 nm or less. In some embodiments, the wavelength separator component includes one or more long pass linear variable bandpass filters and one or more short pass linear variable bandpass filters. In certain embodiments, the wavelength separator component includes a long pass linear variable bandpass filter and a short pass linear variable bandpass filter.

In some embodiments, the wavelength separator includes one or more linear variable edge filters such as 2 or more, such as 3 or more, such as 4 or more and including 5 or more linear variable edge filters. In certain embodiments, the long pass linear variable edge filter is a linear variable edge filter which passes wavelengths of light across the edge filter that are greater than 400 nm, greater than 450 nm, greater than 500 nm, greater than 550 nm, greater than 600 nm, greater than 650 nm, greater than 700 nm, greater than 750 nm, greater than 800 nm. In certain instances, the wavelength separator includes a short pass linear variable edge filter. In certain embodiments, the short pass linear variable edge filter is a linear variable edge filter which passes wavelengths of light across the edge filter that are 600 nm or less, 550 nm or less, 500 nm or less, 450 nm or less, 400 nm or less, 350 nm or less, 300 nm or less, 250 nm or less, 200 nm or less. In some embodiments, the wavelength separator component includes one or more long pass linear variable edge filters and one or more short pass linear variable edge filters. In certain embodiments, the wavelength separator component includes a long pass linear variable edge filter and a short pass linear variable edge filter.

In some embodiments, the detector component includes an optical adjustment component that is capable of changing the spatial width of the light from the irradiated sample or some other characteristic of the light, such as for example, propagation direction, wavelength, beam width, beam intensity and focal spot. Optical adjustment protocols may be any convenient device which adjusts one or more characteristics of the light, including but not limited to lenses, mirrors, filters, fiber optics, wavelength separators, pinholes, slits, collimating protocols and combinations thereof.

In embodiments, the light detection system includes a modulator component that bins data signal from different photodetector channels. In some embodiments, the modulator is configured to bin data signals from two or more different photodetector channels to generate a combined spectral data signal. In some instances, the modulator component bins data signals from non-adjacent photodetectors. In some instances, the modulator component bins data signals from adjacent photodetectors. In certain instances, the modulator component is configured for horizontal binning of data signals from adjacent photodetectors.

In some embodiments, the modulator component is configured to bin data signals from three or more different photodetector channels, such as 4 or more, such as or more, such as 6 or more, such as 16 or more, such as 32 or more and including from 64 or more different photodetector channels. In some embodiments, the binned data signals are wavelength separated data signals. In some embodiments, the binned data signals are time separated data signals. In some embodiments, the binned data signals are time and wavelength separated data signals. In some embodiments, the modulator component is configured to bin the data signals from the photodetector channels based on the irradiation wavelength of each of the lasers. In some instances, the modulator component is configured to bin the data signals from the photodetector channels based on a time delay for each of the lasers.

In certain embodiments, the modulator component is configured to dynamically bin data signals from two or more different photodetector channels in real time. In certain instances, the modulator component includes an integrated circuit. In embodiments, the integrated circuit device may be a field programmable gated array (FPGA), an application specific integrated circuit (ASIC) or a complex programmable logic device (CPLD), or some other integrated circuit device. For example, the integrated circuit may be a field programmable gate array (FPGA), such as where the FPGA includes programming to dynamically bin the data signals from different photodetector channels. In certain instances, the modulator component is programmed with a mapped binning configuration for each different laser and for each photodetector channel, for example where the modulator component includes an FPGA having programming for dynamically mapping a binning configuration in real-time.

In some embodiments, the modulator component includes one or more amplifiers. In some embodiments, the amplifier component includes a plurality of amplifiers, such as transimpedence amplifiers, summing amplifiers, differential amplifiers or a combination thereof. In some instances, the modulator component includes an amplifier for each photodetector channel, such as where the modulator component includes 2 or more amplifiers, such as 4 or more, such as 8 or more, such as 12 or more, such as 16 or more, such as 20 or more, such as 24 or more, such as 28 or more, such as 32 or more, such as 36 or more, such as 40 or more, such as 44 or more, such as 48 or more, such as 52 or more, such as 56 or more, such as 60 or more and including 64 or more amplifiers.

In some embodiments, the modulator component includes a first amplifier component which is configured to amplify data signals from each photodetector channel and a second amplifier component configured to amplify data signals from the electronic switch component. In some instances, the first amplifier component includes a plurality of transimpedance amplifiers and the second amplifier component includes a plurality of differential amplifiers.

In some instances, the modulator component includes an electronic switch (e.g., a digital switch circuit) configured to bin data signals from two or more different photodetector channels. In certain instances, the switch is configured to multiplex or de-multiplex the output data signals from each photodetector channel. Depending on the number of photodetector channels and amplifiers (as described above) employed in the light detection system, the electronic switch component may include 2 or more electronic switches, such as 3 or more electronic switches, such as 4 or more electronic switches, such as 5 or more electronic switches, such as 6 or more electronic switches, such as 7 or more electronic switches, such as 8 or more electronic switches, such as 9 or more electronic switches, such as 10 or more electronic switches, such as 15 or more electronic switches, such as 25 or more electronic switches, such as 50 or more electronic switches, such as 100 or more electronic switches, such as 250 or more electronic switches, such as 500 or more electronic switches, such as 750 or more electronic switches and including 1000 or more electronic switches.

In some embodiments, light detection systems of interest include a photodetector array having N photodetector channels and an amplifier component having N transimpedance amplifiers, where N is an integer from 4 to 1000. In certain instances, the light detection system includes a photodetector array having N photodetector channels and a modulator component with N transimpedance amplifiers and an electronic switch component having an array of N×N switches. In some instances, the photodetector array may be a photodiode array having N photodiodes. The modulator component in these embodiments may include N transimpedence amplifiers and an array of N×N switches. In some embodiments, N is 8. In other embodiments, N is 16. In other embodiments, N is 32. In other embodiments, N is 64. In other embodiments, N is 128.

Figure 3A:
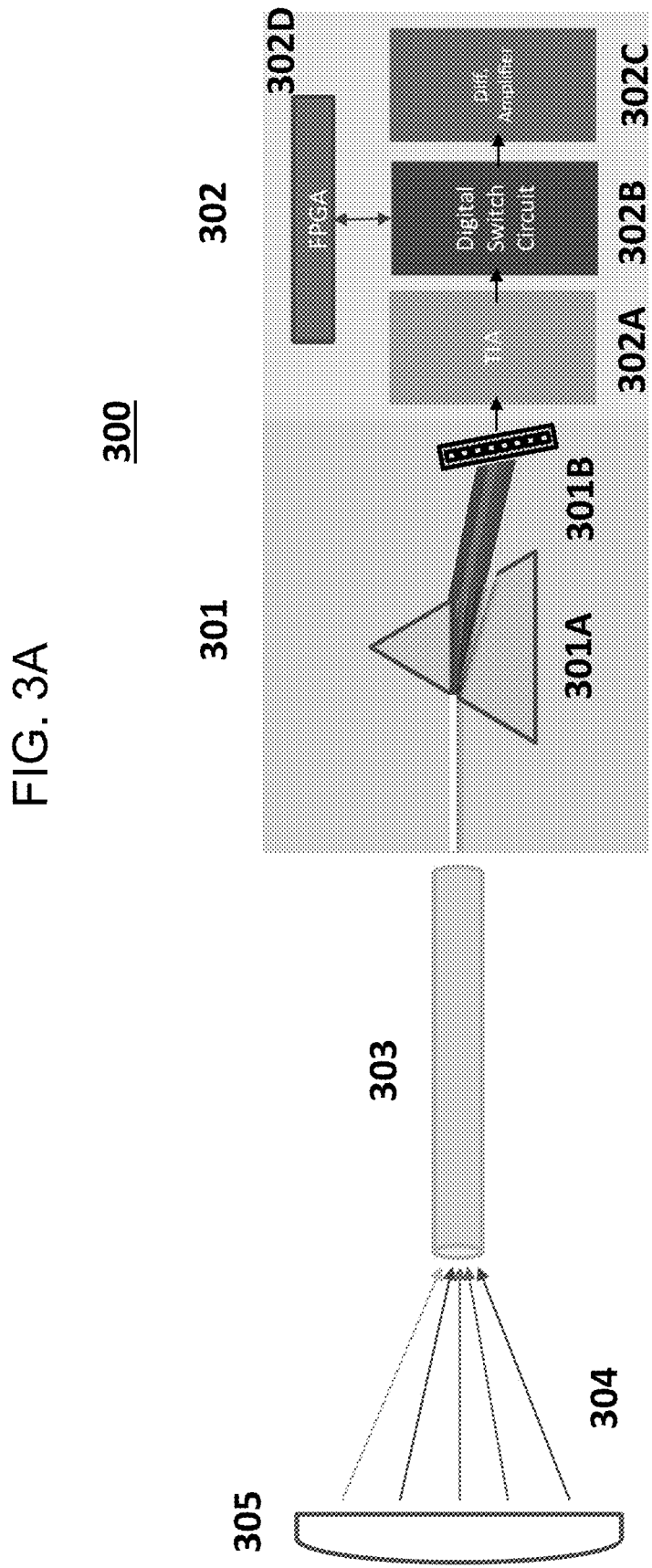
FIG. 3A depicts a light detection system having a detector component and modulator component according to certain embodiments.

FIG. 3A depicts a light detection system having a detector component and modulator component according to certain embodiments. Light from a sample irradiated by a plurality of light sources (e.g., lasers) is propagated from the flow stream through lens 305 where light rays 304 (which correspond to the light generated in response to irradiation by each light source) are conveyed to a light-receiving end of fiber optics 303. Light is propagated from fiber optics 303 to detector component 301 of light detection system 300. Detector component 301 includes wavelength separator 301A (e.g., spectrometer) which is configured to spectrally separate predetermined wavelengths of light received from fiber optics 303. Each of the predetermined spectral ranges of light is detected by photodetector array 301B in a plurality of photodetector channels. Light detection system 300 includes modulator component 302 that bins data signals from different photodetector channels. Modulator component 302 includes a first amplifier component 302A having a plurality of amplifiers (e.g., transimpedance amplifiers) which amplify data signals from each of the photodetector channels. The amplified data signals are conveyed through electronic switch component 302B (e.g., digital switch circuit) to a second amplifier component 302C (e.g., having a plurality of differential amplifiers). In some instances, modulator component 302 includes an integrated circuit 302D, such as a field programmable gate array (FPGA) having programming for binning data signals from each of the photodetector channels.

Figure 3B:
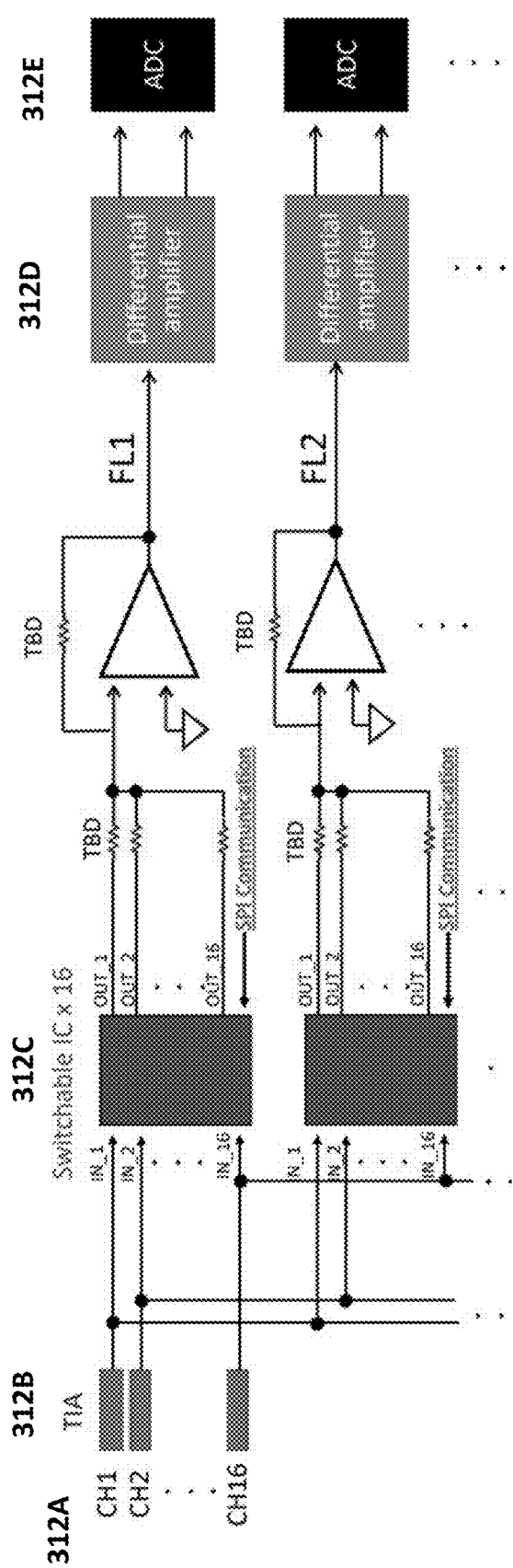
FIG. 3B depicts a schematic of a modulator component of light detection systems according to certain embodiments.

FIG. 3B depicts an electronic schematic of a modulator component of light detection systems according to certain embodiments. Modulator component 312 includes a pre-amplification circuit 312B that includes a plurality of transimpedance amplifiers configured to amplify data signals from each photodetector channel 312A. Amplified data signals from each of the photodetectors is conveyed to electronic switch component 312C where data signals from two or more of the photodetector channels are binned, such as by implementing a mapped binning configuration programmed into an integrated circuit that is in electronic communication with switch circuit 312C. Binned data signals from electronic switch component 312C are further amplified by a set of output amplification circuits 312D which can employ differential amplifiers. The combined and amplified data signals after conveyed to a digitizing component 312E such as an analog-to-digital converter (ADC).

Figure 3C:
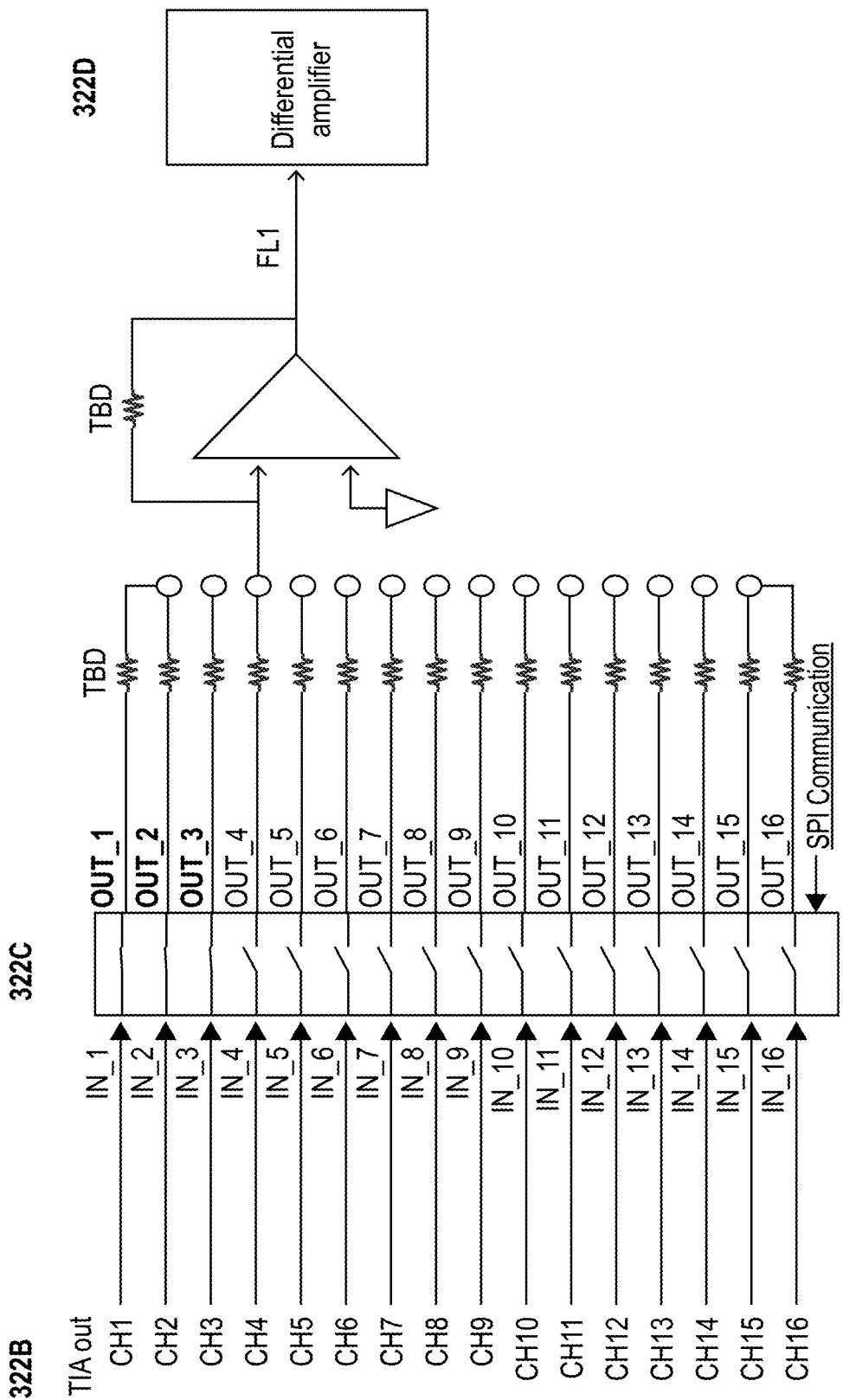
FIG. 3C depicts binning data signals from a plurality of photodetector channels with a light detection system according to certain embodiments.
Figure 3C:
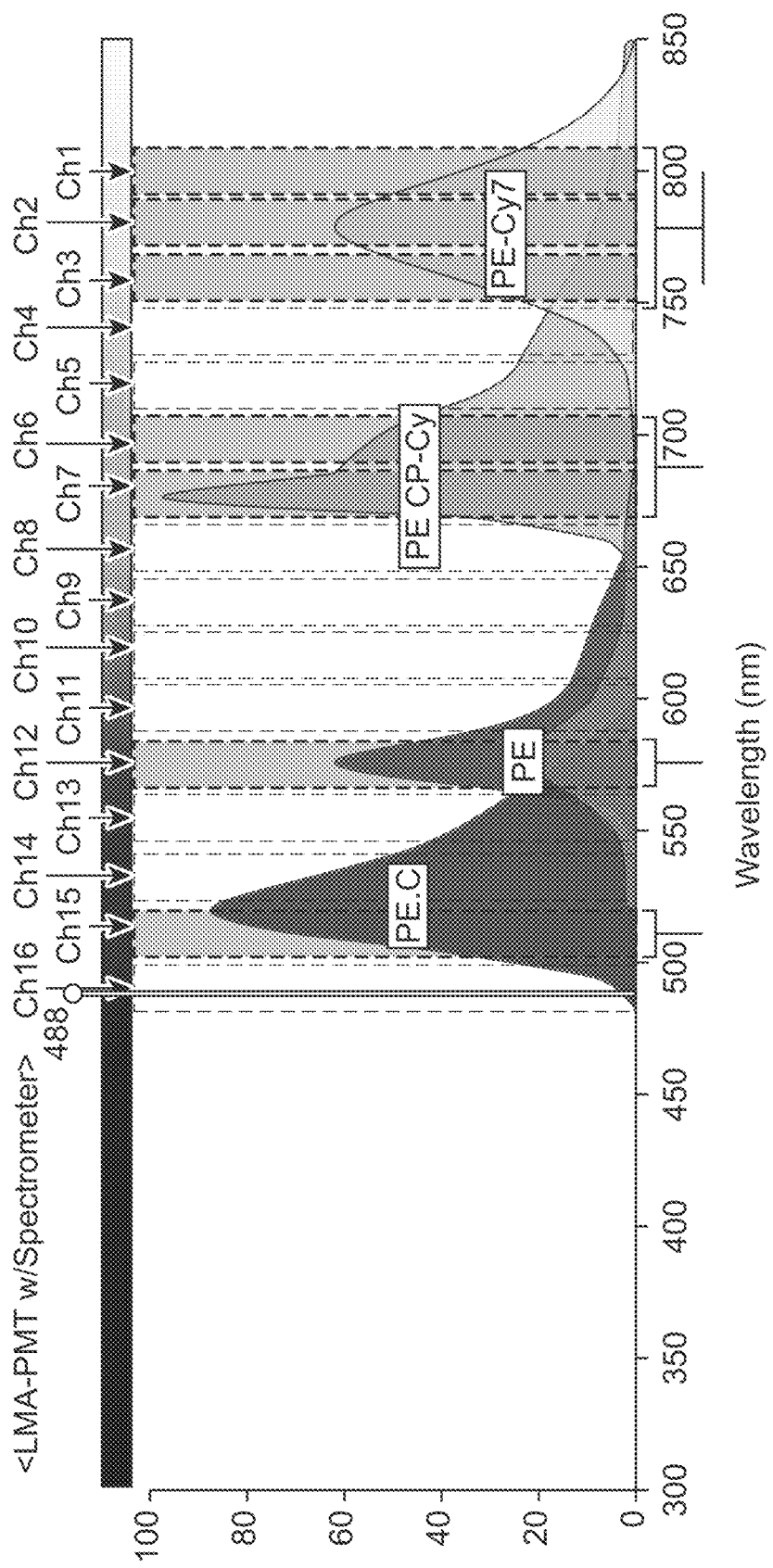

FIG. 3C depicts an example of binning data signals from a plurality of photodetector channels with a light detection system according to certain embodiments. Fluorescence from fluorophore phycoerythrin cyanine 7 (PE-Cy7) is detected with a light detection system configured to detect light in 16 different channels ($Ch_1$-$Ch_{16}$). Data signals are generated in photodetector channels $Ch_1$, $Ch_2$ and $Ch_3$ of the light detection system in response to the fluorescence from PE-Cy7. Amplified signals from transimpedance amplifier component 322B are conveyed to electronic switch component 322C which bins the generated data signals from photodetector channels $Ch_1$, $Ch_2$ and $Ch_3$. The binned data signals from photodetector channels $Ch_1$, $Ch_2$ and $Ch_3$ are conveyed as fluorescence data signals FL1 to differential amplifier 322D before digitizing with an analog-to-digital converter.

Systems

Aspects of the present disclosure also include systems, such as where systems are part of or operationally coupled to a particle analyzer system (e.g., a flow cytometer). In embodiments, systems include a light detection system as described in detail above. In some instances, systems further include a light source for irradiating a sample having particles in a flow stream. Systems of interest include a light source configured to irradiate a sample in a flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances, the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 m, such as from 50 μm to 5000 μm, such as from 75 μm to 1000 μm, such as from 100 m to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 µL/min (microliter per minute) or more, such as 2 µL/min or more, such as 3 µL/min or more, such as 5 L/min or more, such as 10 µL/min or more, such as 25 µL/min or more, such as 50 L/min or more, such as 75 µL/min or more, such as 100 µL/min or more, such as 250 L/min or more, such as 500 µL/min or more, such as 750 µL/min or more and including 1000 µL/min or more. For example, the system may include a pump that is configured to flow sample through the flow cell at a rate that ranges from 1 µL/min to 500 µL/min, such as from 1 µL/min to 250 µL/min, such as from 1 µL/min to 100 µL/min, such as from 2 L/min to 90 µL/min, such as from 3 µL/min to 80 µL/min, such as from 4 µL/min to 70 L/min, such as from 5 µL/min to 60 µL/min and including rom 10 µL/min to 50 µL/min. In certain embodiments, the flow rate of the flow stream is from 5 µL/min to 6 µL/min.

In certain embodiments, light detection systems having the plurality of photodetectors as described above are part of or positioned in a particle analyzer, such as a particle sorter. In certain embodiments, the subject systems are flow cytometric systems that includes the photodiode and amplifier component as part of a light detection system for detecting light emitted by a sample in a flow stream. Suitable flow cytometry systems may include, but are not limited to, those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3): 203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In some embodiments, the subject systems are particle sorting systems that are configured to sort particles with an enclosed particle sorting module, such as those described in U.S. Patent Publication No. 2017/0299493, the disclosure of which is incorporated herein by reference. In certain embodiments, particles (e.g., cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

In certain instances, flow cytometry systems of the invention are configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 4A:
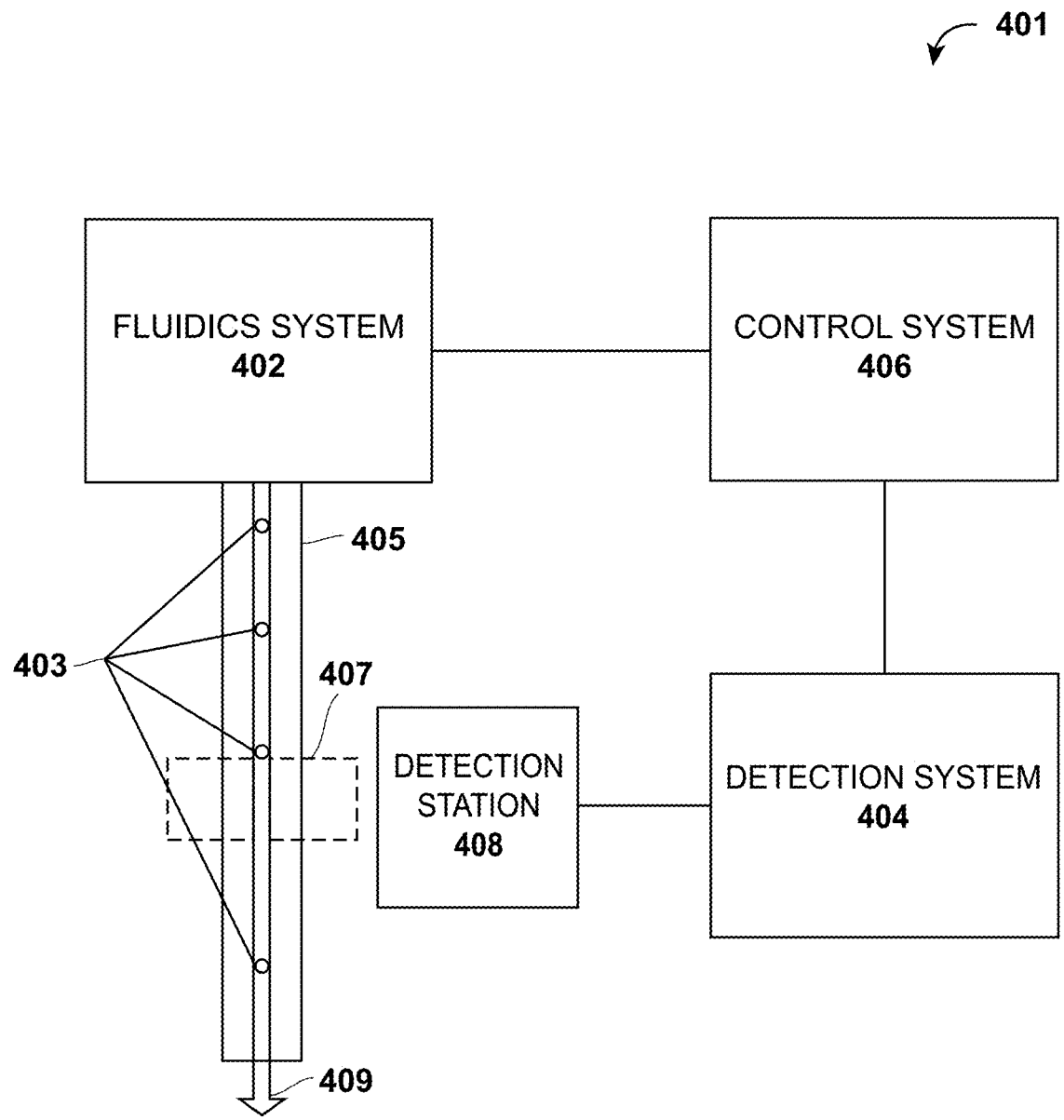
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first-time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first-time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
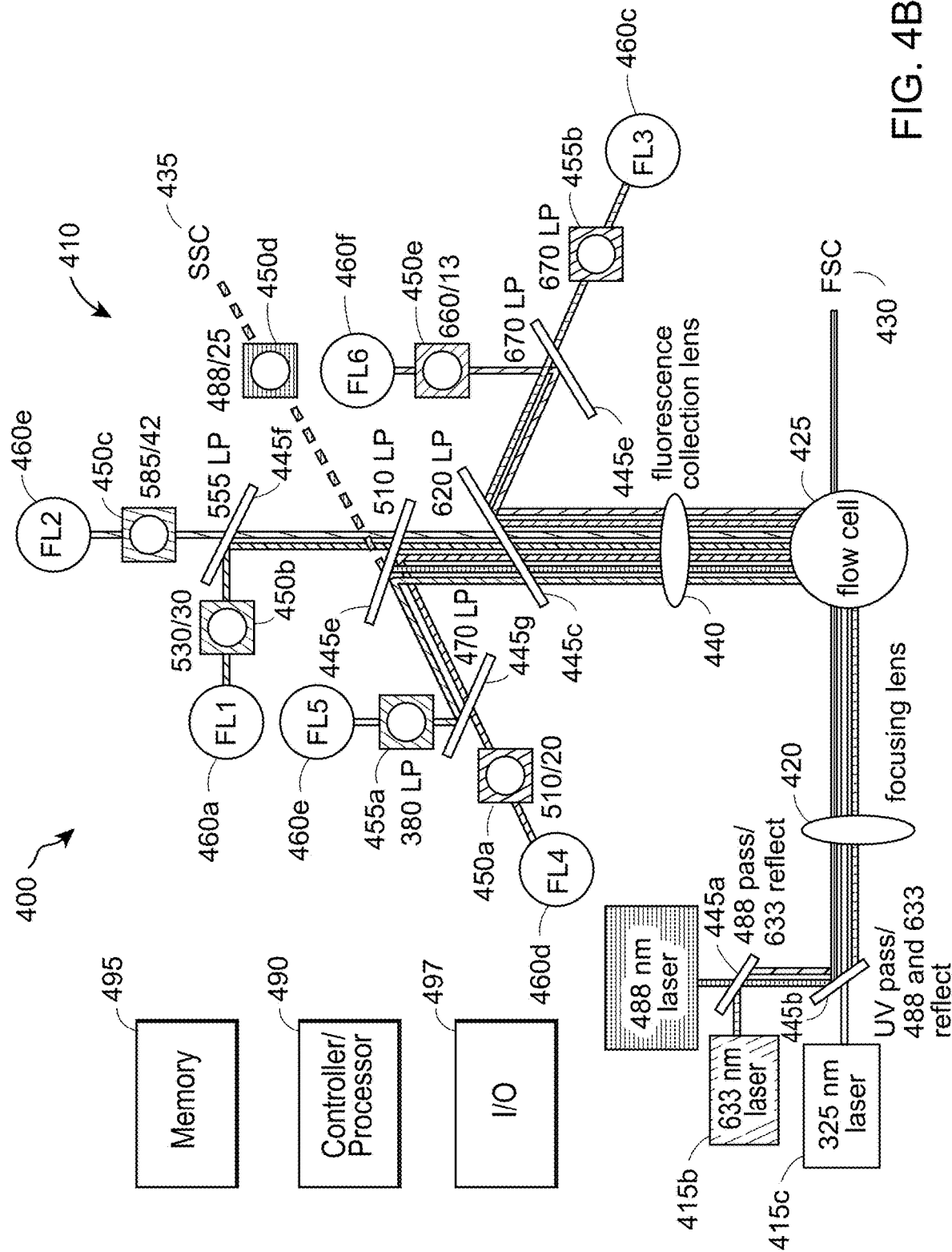
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495.

The controller/processor 490 can be configured to evaluate one or more assignments of labels to markers.

Figure 5:
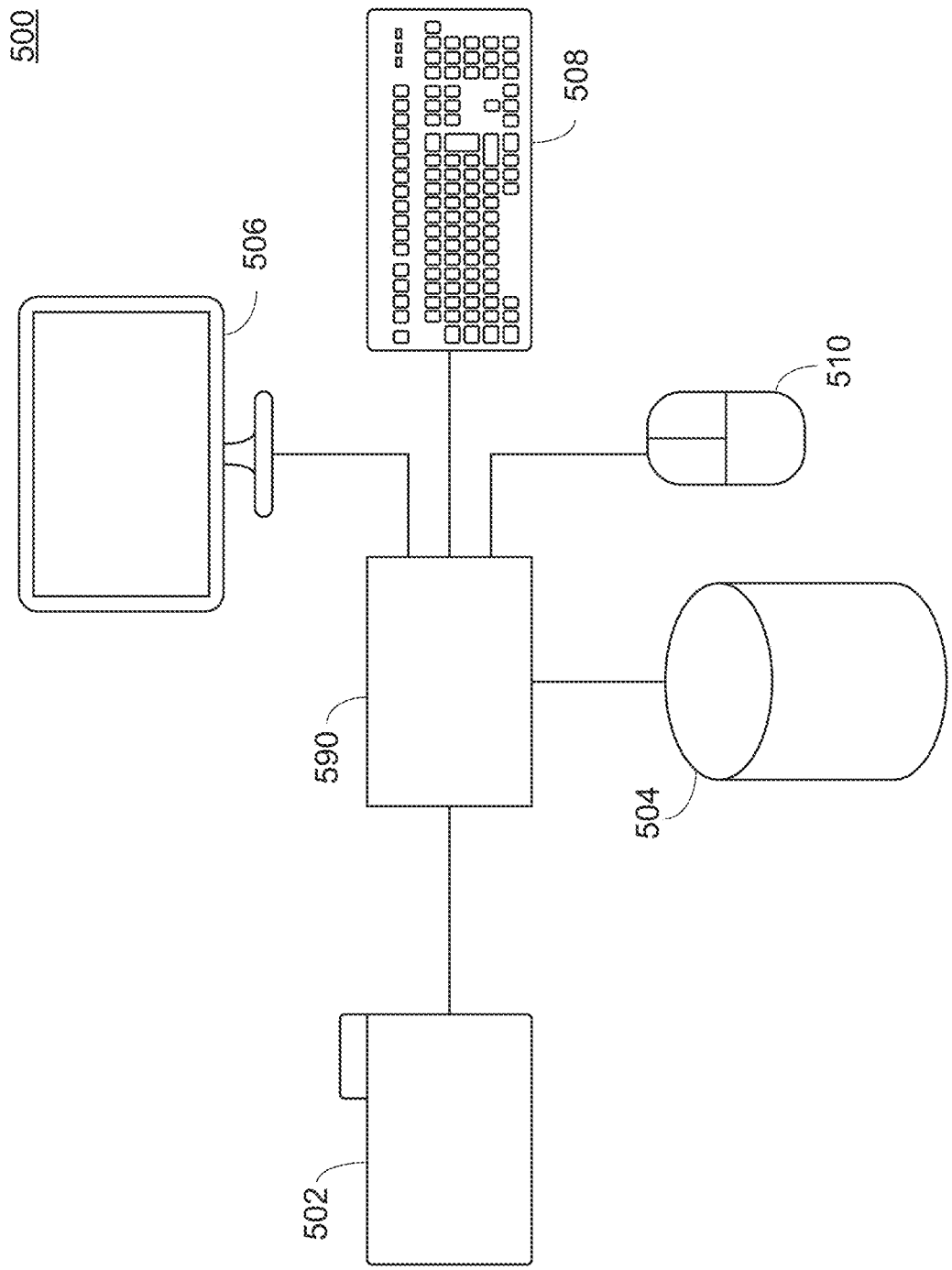
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
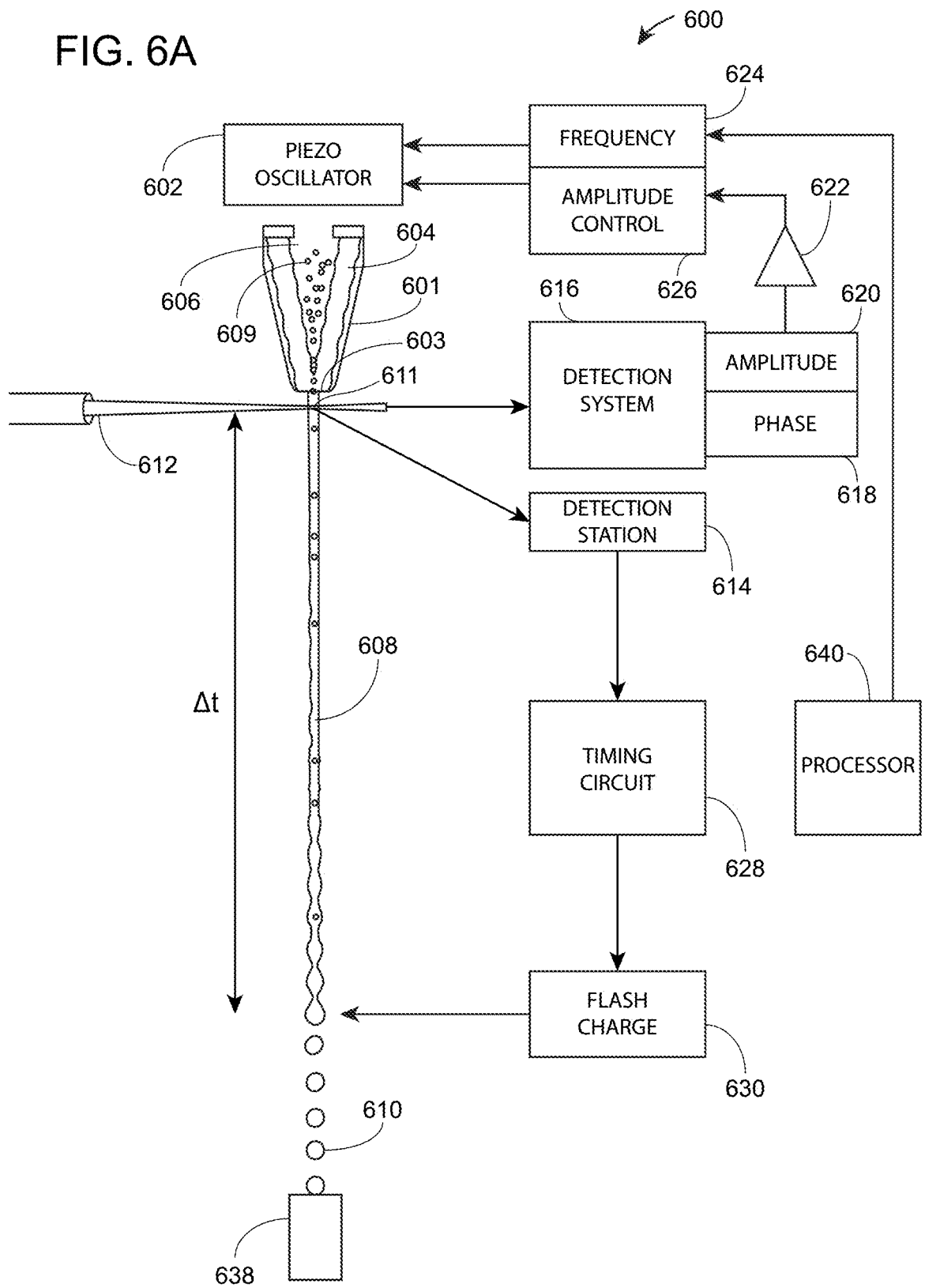
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g., a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g., a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
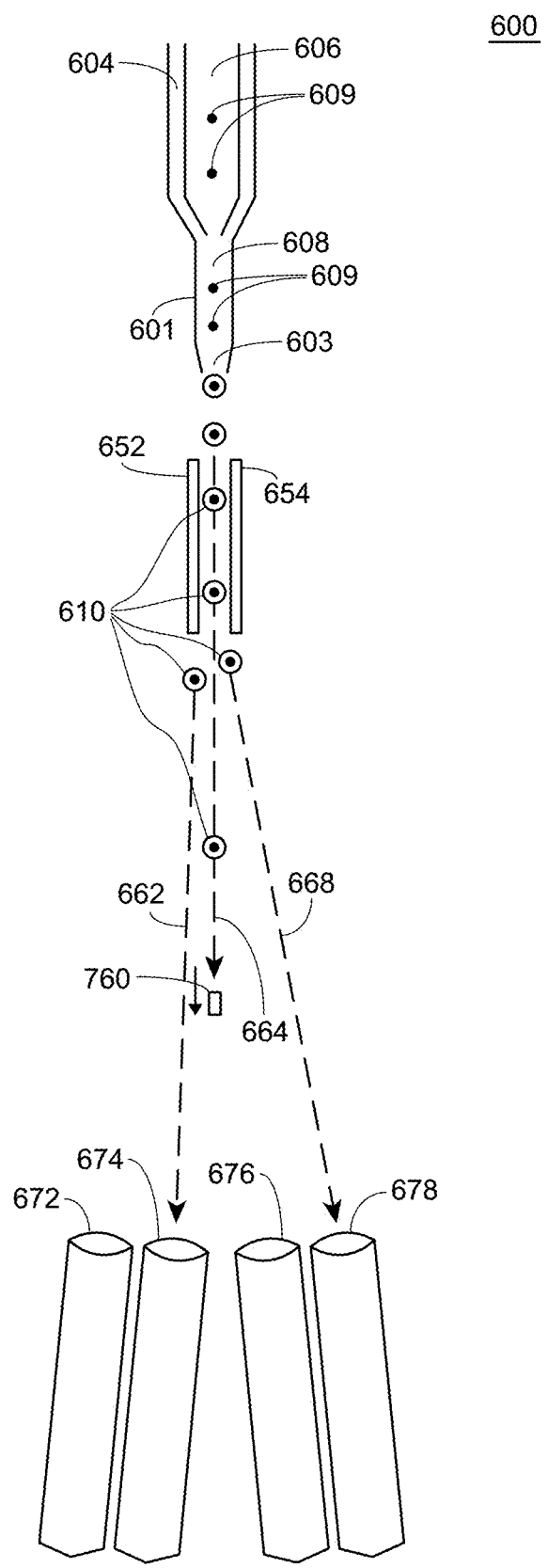
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation of the methods described herein. In some embodiments, systems include a computer having a computer readable storage medium with a computer program stored thereon, where the computer program when loaded on the computer includes instructions for practicing the subject methods. Computer programs according to certain embodiments include instructions for detecting light with a light detection system from a particle irradiated by a light source in a flow stream, instructions for generating data signals in a plurality of photodetector channels in response to the detected light and algorithm for binning data signals from two or more different photodetector channels. In some embodiments, the computer program includes instructions for generating combined spectral data signals from the binned data signals.

In embodiments, the computer program includes instructions for binning data signal from different photodetector channels. In some embodiments, the computer program includes instructions for dynamically binning data signals from two or more different photodetector channels to generate a combined spectral data signal. In some instances, the computer program includes instructions for binning data signals from non-adjacent photodetectors. In some instances, the computer program includes instructions for binning data signals from adjacent photodetectors. In certain instances, the computer program includes instructions for horizontal binning of data signals from adjacent photodetectors. In some embodiments, the computer program includes instructions for binning data signals from three or more different photodetector channels, such as 4 or more, such as 5 or more, such as 6 or more, such as 16 or more, such as 32 or more and including from 64 or more different photodetector channels. In some embodiments, the binned data signals are wavelength separated data signals. In some embodiments, the binned data signals are time separated data signals. In some embodiments, the binned data signals are time and wavelength separated data signals. In some embodiments, the computer program includes instructions for binning the data signals from the photodetector channels based on the irradiation wavelength of each of the lasers. In some instances, the computer program includes instructions m for binning the data signals from the photodetector channels based on a time delay for each of the lasers.

In certain embodiments, the computer program includes instructions for amplifying data signals from one or more photodetector channels. In some instances, the computer program includes instructions for amplifying data signals from each photodetector channel and binning the amplified data signals. In some embodiments, the computer program includes instructions for multiplexing the generated data signals. In some instances, the computer program includes instructions for binning the multiplexed data signals.

In some embodiments, the computer program includes instructions for irradiating the particle in the flow stream with a light source. As described above, in some instances the light source includes a plurality of lasers, such as where the computer program includes instructions for irradiating the flow stream with the plurality of lasers at positions that are spaced apart from each other. In some instances, the computer program includes instructions for irradiating the particle in the flow stream in discrete intervals with each of the lasers, such as where each laser has an irradiation duration of from 1 µs to 50 µs.

In some embodiments, the computer program includes instructions for binning the data signals from the photodetector channels based on the irradiation wavelength of each of the lasers. In some instances, the computer program includes instructions for binning the data signals from the photodetector channels based on a time delay for each of the lasers. In certain instances, the computer program includes instructions for mapping a binning configuration for each different laser and for each photodetector channel, for example where the computer program includes instructions for dynamically mapping a binning configuration in real-time.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows, iOS, Oracle Solaris, Linux, IBM i, Unix, and others.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Non-Transitory Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Python, Java, Java Script, C, C #, C++, Go, R, Swift, PHP, as well as any many others.

Non-transitory computer readable storage medium according to certain embodiments includes instructions having algorithm for detecting light with a light detection system from a particle irradiated by a light source in a flow stream, algorithm for generating data signals in a plurality of photodetector channels in response to the detected light and algorithm for binning data signals from two or more different photodetector channels. In some embodiments, the non-transitory computer readable storage medium includes instructions having algorithm for generating combined spectral data signals from the binned data signals.

In embodiments, the non-transitory computer readable storage medium includes algorithm for binning data signal from different photodetector channels. In some embodiments, the non-transitory computer readable storage medium includes algorithm for dynamically binning data signals from two or more different photodetector channels to generate a combined spectral data signal. In some instances, the non-transitory computer readable storage medium includes algorithm for binning data signals from non-adjacent photodetectors. In some instances, the non-transitory computer readable storage medium includes algorithm for binning data signals from adjacent photodetectors. In certain instances, the non-transitory computer readable storage medium includes algorithm for horizontal binning of data signals from adjacent photodetectors. In some embodiments, the non-transitory computer readable storage medium includes algorithm for binning data signals from three or more different photodetector channels, such as 4 or more, such as 5 or more, such as 6 or more, such as 16 or more, such as 32 or more and including from 64 or more different photodetector channels. In some embodiments, the binned data signals are wavelength separated data signals. In some embodiments, the binned data signals are time separated data signals. In some embodiments, the binned data signals are time and wavelength separated data signals. In some embodiments, the non-transitory computer readable storage medium includes algorithm for binning the data signals from the photodetector channels based on the irradiation wavelength of each of the lasers. In some instances, the non-transitory computer readable storage medium includes algorithm for binning the data signals from the photodetector channels based on a time delay for each of the lasers.

In certain embodiments, the non-transitory computer readable storage medium includes algorithm for amplifying data signals from one or more photodetector channels. In some instances, the non-transitory computer readable storage medium includes algorithm for amplifying data signals from each photodetector channel and binning the amplified data signals. In some embodiments, the non-transitory computer readable storage medium includes algorithm for multiplexing the generated data signals. In some instances, the non-transitory computer readable storage medium includes algorithm for binning the multiplexed data signals.

In some embodiments, the non-transitory computer readable storage medium includes algorithm for irradiating the particle in the flow stream with a light source. In some instances, the light source includes a plurality of lasers, such as where the non-transitory computer readable storage medium includes algorithm for irradiating the flow stream with the plurality of lasers at positions that are spaced apart from each other. In some instances, the non-transitory computer readable storage medium includes algorithm for irradiating the particle in the flow stream in discrete intervals with each of the lasers, such as where each laser has an irradiation duration of from 1 μs to 50 μs.

In some embodiments, the non-transitory computer readable storage medium includes algorithm for binning the data signals from the photodetector channels based on the irradiation wavelength of each of the lasers. In some instances, the non-transitory computer readable storage medium includes algorithm for binning the data signals from the photodetector channels based on a time delay for each of the lasers. In certain instances, the non-transitory computer readable storage medium includes algorithm for mapping a binning configuration for each different laser and for each photodetector channel, for example where the non-transitory computer readable storage medium includes algorithm for dynamically mapping a binning configuration in real-time.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as those mentioned above, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the present disclosure further include kits, where kits include one or more of the components of light detection systems described herein. In some embodiments, kits include a wavelength separator (e.g., a spectrometer), plurality of photodetectors, one or more electronic components such as transimpedance amplifiers, differential amplifiers, electronic switch components and programming for the subject systems, such as in the form of a computer readable medium (e.g., flash drive, USB storage, compact disk, DVD, Blu-ray disk, etc.) or instructions for downloading the programming from an internet web protocol or cloud server. Kits may also include an optical adjustment component, such as lenses, mirrors, filters, fiber optics, pinholes, slits, collimating protocols and combinations thereof.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to optimize particle identification, characterization and sorting. The subject methods and systems provide for detecting light using spectral discrimination and for identifying or characterizing a particle in a flow stream. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method comprising:
   detecting light with a light detection system from a particle irradiated by a light source in a flow stream;
   generating spectral data signals in a plurality of photodetector channels in response to the detected light;
   binning data signals from two or more different photodetector channels based on wavelength of the detected light and a time delay of the irradiating light source; and
   summing the binned data signals to generate combined spectral data signals.

2. The method according to claim 1, wherein the light detection system comprises a plurality of photodetectors.

3. The method according to claim 2, wherein the light detection system comprises an array of photodetectors.

4. The method according to claim 1, wherein the light detection system comprises a spectrometer.

5. The method according to claim 4, wherein the spectrometer comprises a light dispersion component configured to spectrally separate light from the irradiated particle.

6. The method according to claim 5, wherein each photodetector channel is configured to generate data signals in response to a predetermined spectral range of light.

7. The method according claim 1, wherein the method comprises binning data signals from adjacent photodetector channels.

8. The method according to claim 7, wherein the method comprises horizontal binning of adjacent photodetector channels.

9. The method according to claim 1, wherein the method comprises binning data signals from three or more different photodetector channels.

10. The method according to claim 1, wherein the method comprises:
    amplifying the data signals from each photodetector channel; and
    binning the amplified data signals.

11. The method according claim 1, wherein the method comprises irradiating the particle in the flow stream with the light source.

12. The method according to claim 11, wherein the light source comprises a plurality of lasers configured to irradiate the flow stream at positions that are spaced apart from each other.

13. The method according to claim 12, wherein the method comprises irradiating the particle in the flow stream in discrete intervals with each of the plurality of lasers.

14. The method according to claim 12, wherein the method comprises dynamically mapping in real-time a binning configuration for each different laser and for each photodetector channel.

15. The method according claim 1, wherein the combined spectral data signals comprise binned data signals that are wavelength and time separated.

16. The method according claim 1, wherein the method further comprises multiplexing the generated data signals.

17. A light detection system comprising:
    a detector component comprising a photodetector configured to detect light from a particle irradiated by a light source in a flow stream and to generate spectral data signals in a plurality of photodetector channels in response to the detected light; and
    a modulator component configured to bin data signals from two or more different photodetector channels based on wavelength of the detected light and a time delay of the irradiating light source and sum the binned data signals to generate combined spectral data signals.

18. The light detection system according to claim 17, wherein the detector component comprises a plurality of photodetectors.

19. The light detection system according to claim 18, wherein the detector component comprises an array of photodetectors.

20. A system comprising:
    a light source configured to irradiate a particle propagating through a flow stream; and
    a light detection system comprising:
    a detector component comprising a photodetector configured to detect light from the irradiated particle and to generate spectral data signals in a plurality of photodetector channels in response to the detected light; and
    a modulator component configured to bin data signals from two or more different photodetector channels based on wavelength of the detected light and a time delay of the light source and sum the binned data signals to generate a combined spectral data signal.

* * * * *